3,205,226
19-NOR-5(10)-DEHYDRO STEROIDS AND METHODS FOR THEIR MANUFACTURE
Derek H. R. Barton, Northwood, England, assignor to Schering Corporation, Bloomfield, N.J., a corporation of New Jersey
No Drawing. Filed Aug. 20, 1962, Ser. No. 218,123
20 Claims. (Cl. 260—239.55)

This application relates to novel steroids and to methods for their preparation. More particularly, this application relates to novel 19-nor-cyclopentanophenanthrenes having a double bond between the 5 and 10 carbon atoms. Specifically, this application relates to 3-keto-11β-hydroxy-19-nor-5(10)-dehydro steroids of the androstane and pregnane series including esters and derivatives thereof which are therapeutically active per se and which are valuable as intermediates in preparing other therapeutically active steroids, including methods of manufacturing of these novel 5(10)-dehydro steroids.

Among the novel 3-keto-11β-hydroxy-19-nor-5(10)-dehydro steroids of this invention are 19-nor-androstanes and 19-nor-pregnanes of the following formula I:

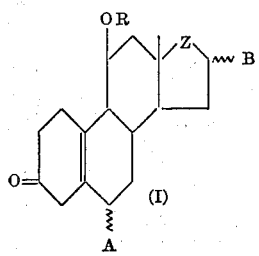

wherein A is a member selected from the group consisting of H, lower alkyl, and halogen, preferably chlorine and fluorine; B is a member selected from the group consisting of H, lower alkyl, hydroxy and an acyloxy radical of an organic carboxylic acid having up to 8 carbon atoms; R is a member selected from the group consisting of hydrogen and an acid radical of an organic carboxylic acid having up to 8 carbon atoms; and Z is a member selected from the group consisting of

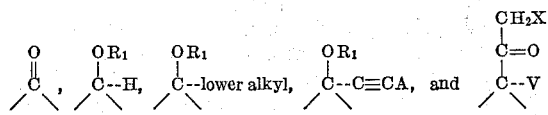

wherein $R_1$ is selected from the group consisting of H and an acid radical of an organic carboxylic acid having up to 8 carbon atoms; $A_1$ is a member selected from the group consisting of H, lower alkyl and halogen; V is a member selected from the group consisting of H, hydroxy and an acyloxy radical of an organic carboxylic acid having up to 8 carbon atoms; and X is a member selected from the group consisting of H, halogen, hydroxy, and acyloxy.

Also included among the novel 19-nor-5(10)-dehydro steroids of this invention are lower alkyl analogs of the compounds defined by formula I, such as the 2α-methyl and 7α-methyl analogs.

In the above formula and throughout the specification and in the claims of this application, a bond indicated by a wavy line (i.e., ~) signifies that both the alpha and beta isomers are included. Additionally, in a compound name wherein the configuration of a substituent is not specifically designated as alpha or betal, both configurations are to be included. Thus the compound name, 16-methyl - 19 - nor - 5(10) - pregnene - 11β,21 - diol - 3,20-dione, includes the 16α-methyl and 16β-methyl isomers.

By "lower alkyl" is meant hydrocarbon radicals having up to four carbon atoms, thus including methyl, ethyl, n-propyl, isopropyl, n-butyl, isopropylmethyl, and tert-butyl radicals.

Typical esters at C–11, C–16, and C–17 are lower alkanoates such as formate, acetate, propionate, butyrate, and enanthate, or aromatic acyl radicals such as benzoate or toluate.

Illustrative of the 21-acyl group which may be present are lower alkanoates such as formate, acetate, propionate, isobutyrate, valerate, pivalate, caproate (n-hexanoate), enanthate; sulfonates, such as methyl-sulfonate and p-toluene-sulfonate; aromatic acyl radicals such as benzoate and toluate, the acyl portions of dibasic acids such as succinate and phthalate, and the acid radical of inorganic dibasic acids, such as phosphoric, and sulfuric, including the metal salts thereof.

Compounds illustrative of this invention are 19-nor-5(10) - pregnene - 11β,21 - diol - 3,20 - dione, the 11-formate ester thereof, and the 11-formate 20-ethylene ketal 21-acetate thereof; 19 - nor - 5(10) - androstene-11β,17β-diol-3-one and the 11-formate 17-acetate thereof as well as their 17α-methyl analogs, i.e., 17α-methyl-19-nor - 5(10) - androstene - 11β,17β - diol - 3 - one and 17α - methyl - 19 - nor - 5(10) - androstene - 11β,17β-diol-3-one 11-formate 17-acetate; 19-nor-5(10)-pregnene-11β,17α,21 - triol - 3,20 - dione and the 11-formate 21-acetate diester thereof; 19 - nor - 5(10) - pregnene - 11β, 16α,21-triol-3,20-dione and the 11-formate - 16,21 - diacetate tri-ester thereof; 16α - methyl - 19 - nor - 5(10)-pregnene - 11β,21 - diol - 3,20 - dione, and the 11-formate 21-acetate diester thereof; 19-nor-5(10)-pregnene-11β-ol-3,20-dione and the 11-formate thereof; 19 - nor - 5(10)-pregnene - 11β,17α - diol - 3,20 - dione and the 11-formate 17-acetate diester thereof; 19 - nor - 5(10) - androstene-11β - ol - 3,17 - dione 11 - formate, 6α - fluoro - 19 - nor-5(10) - pregnene - 11β,21 - diol - 3,20 - dione 11 - formate and the 6β-epimer thereof; 6α-methyl-19-nor-5(10)-pregnene-11β,21-diol-3,20-dione and the 6β-epimer thereof; and 6α - chloro - 19 - nor - 5(10) - pregnene - 11β,17α-diol-3,20-dione and the 6β-chloro-epimer thereof.

The novel 3-keto-11β-hydroxy-19-nor- 5(10)-dehydro steroids of this invention are prepared by my novel process whereby the 11-nitrite ester of an 11β-hydroxy steroid having an oxygen function at C–3 and a Δ⁴ or a Δ⁵⁽⁶⁾-double bond and being devoid of other unsaturations in the steroidal A-ring, is photolyzed with ultraviolet light, thus forming an 11β-hydroxy-19-oximino intermediate which, in turn, is hydrolyzed to form the corresponding (11→19)-hemiacetal. After hydrolysis of any protective derivatives and oxidation of the 3-hydroxy group, if present, to a 3-keto function and conversion of the Δ⁵⁽⁶⁾-bond, if present, to a Δ⁴-bond, treatment of the resulting 3-keto-Δ⁴-(11→19)-hemiacetal intermediate with an alcoholic solution of strong base yields directly an 11β-formyloxy compound of this invention, i.e., a 3-keto-11β-formyloxy-19-nor-Δ⁵⁽¹⁰⁾-steroid. Hydrolysis under mildly acidic or basic conditions yields the free 3-keto-11β-hydoxy-19-nor-Δ⁵⁽¹⁰⁾- steroids of my invention which are convertible by conventional techinques to other 11-ester derivatives.

My novel process thus involves a sequence of reactions such as indicated below in Table I, with a 3-keto-Δ⁴-11-β-ol starting steroid shown by way of illustration, Z and B being as heretofore defined for formula I, and Z' may be Z or an ethylene ketal derivative of Z:

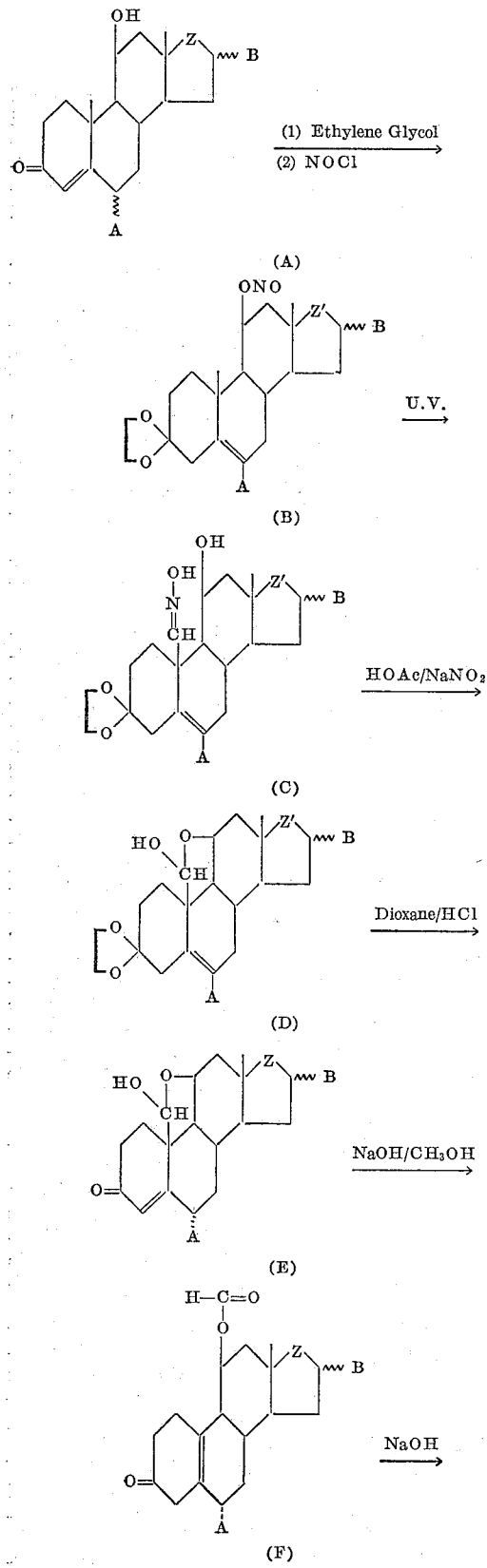

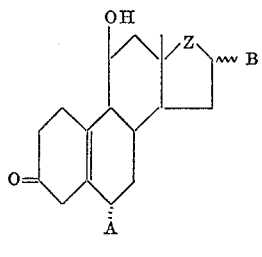

The 3-keto-11β-hydroxy-4-dehydro strating steroids (A) in Table I are shown by way of illustration. In general, as starting compounds for my process there may be used 3-oxygenated-11β-hydroxy-Δ⁴- or Δ⁵⁽⁶⁾-steroids devoid of other A-ring unsaturations such as 3-keto-11β-hydroxy-4-dehydro steroids, 3-keto-11β-hydroxy-5-dehydro steroids and 3β,11β-dihydroxy-5-dehydro steroids. Steroids of the aforenamed categories are well known in the art or can be prepared from known steroids by methods known in the art.

Exemplary of compounds suitable as starting intermediates are known pregnanes and androstanes such as the following: corticosterone (4-pregnene-11β,21-diol-3,20-dione), hydrocortisone (4-pregnene-11β,17α,21-triol-3,20-dione), 6-fluorohydrocortisone, 6-methylhydrocortisone, 4-pregnene-11β,16α,21-triol-3,20-dione diacetate, 16α-methyl-4-pregnene-11β,21-diol-3,20-dione 21-acetate and the 16β-epimer thereof, 5-pregnene-11β,17α,21-triol-3,20-dione, 11β-hydroxyprogesterone (4-pregnene-11β-ol-3,20-dione), 11β,17α-dihydroxyprogesterone (4-pregnene-11β,17α-diol-3,20 - dione), 6α - chloro-17α - hydroxyprogestrone and the 17-acetate therof, 11β-hydroxytestosterone (4-androstene-11β,17β-diol-3-one, 5-pregnene-3β,11β-diol-20-one, 17α-methyl-5-androstene-3β,11β,17β-triol and the like.

When transforming a 3-keto-11β-hydroxy-Δ⁴-starting compound to the corresponding 3-keto-11β-hydroxy-19-nor-Δ⁵⁽¹⁰⁾-steroid by my process (such as is shown in Table I), prior to preparing the 11-nitrite ester (B) any primary or secondary hydroxyl groups other than at C–11 must be protected by preparing, for example, the lower alkanoyl esters thereof under conditions which will not effect the 11-hydroxyl group, after which the 3-keto group and the 17-keto group, if present, in the molecule are preferably protected by a ketal, such as ethylene katal. Other keto groups may optionally be protected by a ketal or other derivative. Thus, for example, corticosterone is first esterified by means of acetic anhydride in pyridine, for example, and the 4-pregnene-11β,21-diol-3,20-dione 21-acetate thereby produced is reacted with ethylene glycol according to known procedures whereby the 3,20-bis-ethylene ketal is formed, i.e. 5-pregnene-11β,21-diol-3,20-bis-ethylene ketal 21-acetate.

With all primary and secondary hydroxyl groups in the molecule other than at C–11 protectively esterified, reaction of the 3-ethylene ketal-Δ⁵-steroidal intermediate (i.e., the ketalized-3-keto-Δ⁴-starting steroid, as shown in Table I) with nitrosyl chloride in pyridine according to known procedures will produce the corresponding 11-nitrite ester (B), e.g., 5-pregnene-11β,21-diol-3,20-bis-ethylene ketal 11-nitrite 21-acetate, the necessary intermediate for the photolysis step of this invention.

The 11β-nitrite-3-ethylenedioxy-Δ⁵-steroid (B), e.g., 5-pregnene-11β,21-diol-3,20-bisethylene ketal 11-nitrite 21-acetate, is then subjected to ultarviolet radiation which possesses a band of radiation corresponding to at least some of the absorption bands of the nitrite radical whereby is produced a mixture of products from which the desired 19-oximino-11β-hydroxy intermediate (C), e.g., 19-oximino-5-pregnene-11β,21-diol-3,20-bisethylene ketal 21-acetate, is isolated utilizing known chromatographic techniques.

The ultraviolet photolysis of an 11-nitrite ester (B) results in the formation of several products. I have found that a minimum of side reactions with a concomitant increase in yield of the desired 19-oxime (C) occurs during the photolysis of an 11-nitrite steroidal ester wherein all other primary and secondary hydroxyl groups have been converted to ester functions and wherein the 17-keto function, if present, and the 3-keto group in a 3-keto-$\Delta^4$-steroid have been protected by ketal derivatives thereof. Thus, for example from the reaction mixture resulting from the ultraviolet photolysis of corticosterone 11-nitrite 21-acetate (4-pregnene-11$\beta$,21-diol-3,20-dione 11-nitrite 21-acetate) the desired 19-oximino intermediate (C) is not produced in isolatable quantities; whereas by the process described herein photolysis of the 3,20-bis-ethyleneketal of coritcosterone 11-nitrite 21-acetate yields the desired 19-oximino intermediate (C) which is isolatable from other products via chromatographic techniques.

The reaction conditions under which the 11-nitrite intermediates (B) are prepared and photolyzed by ultraviolet light in my process are similar to those described in my publication, D. H. R. Barton et al., J. Am. Chem. Soc., 83, 4076–4089 (1961).

Thus, the 11-nitrite-$\Delta^5$-pregnene or androstene intermediates of my process as exemplified in Table I, are prepared by reacting a solution of the corresponding 11$\beta$-hydroxy-5-dehydrosteroid in pyridine, dimethylformamide, ethyl acetate, or other non-polar solvent with a nitrosyl halide, preferably nitrosyl chloride. The nitrosyl chloride or bromide used may be added to the 11$\beta$-hydroxysteroid solution in the same solvent as that used to dissolve the 11$\beta$-hydroxysteroid, or alternatively, it may be introduced as a gas into the solution of the steroidal alcohol. The formation of the 11$\beta$-nitrite ester is usually rapid and generally complete within ½ hour. Nitrosyl chloride is added until there is a color change to orange-brown or other color which persists; at such time it can be assumed that the 11$\beta$-nitrite has formed and the compound in solution is ready for separation and photolysis. The temperatures at which the nitrite formation reactions are carried out range from usually −30° to +30° C. In general, when nitrosyl chloride is the reactant used, the reaction temperature is usually in the neighborhood from −20° C. to +10° C., and preferably at −15° C. to −5° C.

After completion of the formation of the 11$\beta$-nitrite ester, the nitrite is separated usually by adding water to the solution to precipitate the nitrite and by subsequent filtering followed by crystallization and recrystallization, if desired.

According to the process of this invention, as exemplified in table I, the 11-nitrite esters of the 11$\beta$-hydroxy-$\Delta^5$-steroid intermediates, after preparation and isolation as described above, are dissolved in a non-reactive solvent prior to being irradiated by ultraviolet light. The solvent chosen preferably has a high degree of transparency to the ultraviolet radiation within the specified band of nitrite absorption. Solvents which may be used for the photolysis of the nitrite include acetic acid, acetone, acetonitrile, benzene, carbon disulfide, carbon tetrachloride, chlorobenzene, chloroform, cyclohexane, dimethylether, dimethylformamide, dioxane, ethyl acetate, Freon 113, heptane, methanol, ethanol, methylene chloride, and toluene. Of these, benzenes and toluene yield preferred results.

While the solvents used in the photolysis are ordinarily water-free, a small amount of moisture in the solvent used for photolysis does not ordinarily interfere with the progress of the ultraviolet activation and rearrangement of the nitrite in accordance with the present invention.

The ultraviolet radiation used to activate the nitrite radical is that band of radiant energy which corresponds to some or all of the ultraviolet absorption of the nitrite radical, and is from 3000 A. to 4400 A. This ultraviolet radiation activates the nitrite radical and causes it to leave the oxygen at C-11 and transfer to the conformationally adjacent carbon at C-19, with concomitant abstraction of a hydrogen from the 19-carbon by the resulting alkoxy group at C-11. This energy is conveniently supplied by a Hanovia high pressure mercury arc lamp with a Pyrex sleeve, while the nitrite to be reacted is contained in an ultraviolet transmitting vessel such as a water cooled Vycor-immersion well.

During the course of the photolysis of an 11$\beta$-nitrite ester of a 3-oxygenated-5-pregnene or 5-androstene, a stream of nitrogen or other inert gas is generally bubbled through the solution (although not always necessary) to keep the nitrite solution protected by an inert atmosphere.

My process whereby a steroidal 3-oxygenated-11$\beta$-nitrite-5-pregnene or 5-androstene is irradiated by ultraviolet light is usually carried out utilizing a 200 watt mercury lamp as an ultraviolet light source with the irradiated material being dissolved in benzene or toluene and kept under an atmosphere of nitrogen. The reaction is usually carried out at temperatures ranging from 10–50° C. and preferably in the range of 18–40° C.

The photolysis of the nitrite ester which is carried out by irradiation with the selected band of ultraviolet radiation is monitored from time to time by infrared or ultraviolet spectrophotometry of an aliquot, and the reaction is complete when the infrared or ultraviolet absorption spectra lack the characteristic spectra of the nitrite radical.

Upon photolysis of a 3-oxygenated-11$\beta$-nitrite ester of a 5-pregnene or 5-androstene (i.e., a 3-ketal-$\Delta^5$-, a 3-keto-$\Delta^5$-, or a 3$\beta$-acyloxy-$\Delta^5$-intermediate) there is obtained a mixture of products, a major portion being the desired 11$\beta$-hydroxy-19-oximino-$\Delta^5$-steroid (illustratively shown as Compound C in table I) separable by filtration, partition chromatographic techniques or by fractional crystallization, or by a combination of these techniques. My novel compounds are preferably crystallized from organic solvents such as ethyl acetate, acetone, acetone-hexane, methylene chloride, methylene chloride-hexane, methylene chloride-ether and the like, or chromatographed on Florisil using eluting solvents and solvent mixtures such as hexane, ether-hexane, ether, ether-methylene chloride, methylene chloride, methylene chloride-acetone and the like. Alternatively, the 3-oxygenated 19-oximino-$\Delta^5$-intermediate may be isolated using a partition chromatographic system on Chromosorb, such as ligroin, propylene glycol, toluene-propylene glycol or the like. When chromatographic techniques are used, fractions are monitored by infrared and ultraviolet spectroscopy to determine the zones containing the desired 19-oximino-intermediate.

According to my process, the 19-oximino-11$\beta$-hydroxy-$\Delta^5$-intermediate (such as Compound C in Table I) prepared and isolated as described hereinabove, is then hydrolyzed to the corresponding (11→19)-hemiacetal (D) utilizing known techniques such as treatment with aqueous sodium nitrite in glacial acetic acid or with dilute, aqueous hydrochloric acid in acetone. Thus, 19-oximino-5-pregnene-11$\beta$,21-diol-3,20-bis-ethylene ketal 21-acetate treated with sodium nitrite in glacial acetic acid is converted to 5-pregnene-21-ol-3,20-bis-ethylene ketal (11→19)-hemiacetal 21-acetate (i.e., 11$\beta$,19-oxido-5-pregnene-19,21-diol-3,20-bis-ethylene ketal 21-acetate). Regeneration of the 3-keto group in termediate (D) is effected in the usual manner for hydrolyzing ketal derivatives such by means of aqueous hydrochloric acid in dioxane thereby producing a key intermediate in my process, namely, the (11→19)-hemiacetal (E). Thus 5-pregnene-21-ol-3,20-bis-ethylene ketal (11→19)-hemiacetal 21-acetate (D) treated with 1 N hydrochloric acid in dioxane yields 4-pregnene-21-ol-3,20-dione-(11→19)-hemiacetal 21-acetate (E). Alternatively, the 3-ketalized-19-oximino steroidal intermediate (exemplified as Compound C in Table I) may be converted directly to the key intermediate E (i.e., a $\Delta^4$-3-keto-(11→19)-hemiacetal) by reaction with dilute aqueous hydrochloric acid in dioxane or acetone.

The novel 11-formyloxy-19-nor-$\Delta^{5(10)}$-steroids (F) of my invention are derived directly from the key (11→19)-hemiacetal intermediate (E) by treatment with an alcoholic solution of base, such as methanolic sodium hydroxide. The novel 3-keto-11$\beta$-formyloxy-19-nor-$\Delta^{5(10)}$-steroid (F) thereby produced is convertible to the corresponding novel 11$\beta$-hydroxy steroids (G) either by mild acid hydrolysis (such as that utilizing oxalic acid in ethanol) or very mild alkaline hydrolysis (e.g., utilizing a molar equivalent of sodium hydroxide in aqueous dioxane). Conversion of my novel 3-keto-11$\beta$-hydroxy-19-nor-$\Delta^{5(10)}$-dehydro steroids (G) to ester derivatives such as are defined by Formula I is conveniently effected by known techniques such as that utilizing pyridine and an acid chloride or an acid anhydride.

In view of the reaction conditions described herein, any 6-substituted-11$\beta$-formyloxy-19-nor-5(10)-dehydro steroid (F) prepared by my process will possess a 6$\alpha$-substituent. Thus, referring to Table I, 6$\beta$-methylhydrocortisone 21-acetate (Compound A) after ketalization, reaction with nitrosyl chloride, and irradiation with ultraviolet light of the resulting 6-methyl-5-pregnene-11$\beta$,17$\alpha$,21-triol-3,20-bis-ethylene ketal 21-acetate (B), there is obtained 6-methyl-19-oximino-5-pregnene-11$\beta$,17$\alpha$,21-triol-3,20-bis-ethylene ketal (C). Reaction with nitrous acid yields 6-methyl-11$\beta$,19-oxido-5-pregnene-11$\beta$,17$\alpha$,19,21-tetrol-3,20-bis-ethylene ketal 21-acetate (D), which upon reaction with aqueous hydrochloric acid in dioxane yields a 6$\alpha$-substituted intermediate (E), i.e., 6$\alpha$-methyl-11$\beta$,19-oxido-4-pregnene-11$\beta$,17$\alpha$,19,21-tetrol-3-one-20-ethylene ketal 21-acetate which, upon treatment with methanolic sodium hydroxide yields the novel compound (F) 6$\alpha$-methyl-11$\beta$-formyloxy-19-nor-5(10)-pregnene-17$\alpha$,21-diol-3-one-20-ethylene ketal 21-acetate. Alternatively, if the 21-acetoxy group in intermediate (D) is hydrolyzed by known methods prior to reaction with hydrochloric acid in dioxane there is obtained as the 6$\alpha$-intermediate (E), 6$\alpha$-methyl-11$\beta$,19-oxido-4-pregnene-11$\beta$,17$\alpha$,19,21-tetrol-3,20-dione convertible upon treatment with methanolic sodium hydroxide to 6$\alpha$-methyl-11$\beta$-formyloxy-19-nor-5(10)-pregnene-17$\alpha$,21-diol-3,20-dione.

It is apparent that, in essence, my process involves four key steps, namely, the photolysis by means of ultraviolet light of an 11-nitrite ester of a 3-oxygenated-11$\beta$-hydroxy-$\Delta^4$ or $\Delta^5$-steroidal derivative having no other unsaturations in the A-ring, conversion of the 11$\beta$-hydroxy-19-oximino steroid thereby formed to a 3-keto-$\Delta^4$-(11→19)-hemiacetal, treatment of the aforementioned 3-keto-$\Delta^4$-(11→19)-hemiacetal with a strong base whereby is formed a 3-keto-11$\beta$-formyloxy-19-nor-5(10)-dehydro steroid of this invention, which, upon mild acid or basic hydrolysis, is convertible to the corresponding 3-keto-11$\beta$-hydroxy-19-nor-5(10)-dehydro steroids of my invention. Any variations or additional reactions to the basic steps described hereinabove will depend on the choice of starting compound for my process. When the starting steroid utilized is a $\Delta^5$-3-keto-11-hydroxy steroid, e.g., 5-pregnene-11$\beta$,17$\alpha$,21-triol-3,20-dione 21-acetate, a sequence of reactions similar to those outlined in Table I for a 3-keto-$\Delta^4$-steroid may be followed or, alternatively, the preparation of the 3-ketal derivative may be omitted, it not being as essential in a 3-keto-$\Delta^5$-system as in a 3-keto-$\Delta^4$-system to protect the 3-keto group prior to photolysis of the 11-nitrite ester thereof to obtain sufficient yields of the resulting 11$\beta$-hydroxyl-19-oximino derivative. Thus, according to my process, 5-pregnene-11$\beta$,17$\alpha$,21-triol-3,20-dione 11-nitrite 21-acetate is photolyzed by means of ultraviolet light whereby is formed 19-oximino-5-pregnene-11$\beta$,17$\alpha$,21-triol-3,20-dione 21-acetate (which, upon treatment with nitrous acid, i.e., sodium nitrite in acetic acid) yields the corresponding (11→19)-hemiacetal, e.g., 11$\beta$,19-oxido-5-pregnene-17$\alpha$,19,21-triol-3,20-dione 21-acetate. Hydrolysis of the 21-acetate with dilute aqueous sodium hydroxide followed by treatment of the resulting 11$\beta$,19-oxido-5-pregnene-17$\alpha$,19,21-triol-3,20-dione with hydrochloric acid in dioxane yields the key intermediate (E of Table I) 11$\beta$19-oxido-4-pregnene-17$\alpha$,19,21-triol-3,20-dione, which upon reaction with methanolic sodium hydroxide yields 11$\beta$-formyloxy-19-nor-5(10)-pregnene-17$\alpha$,21-diol-3,20-dione of this invention.

When the starting compound used in my process is a 3$\beta$,11$\beta$-dihydroxy-$\Delta^5$-steroid, e.g., 17$\alpha$-methyl-5-androstene-3$\beta$,11$\beta$,17$\beta$-triol, a sequence of reactions similar to those outlined in Table I may be followed with the obvious exception that the first step will involve protection of the 3-hydroxyl group by esterification with acetic acid in pyridine, for example, and the conversion of intermediate D to E (i.e., the $\Delta^5$-3-acetoxy-(11→19)-hemiacetal to the $\Delta^4$-3-keto-(11→19)-hemiacetal) is accomplished through the action of the microorganism *Flavobacterium dehydrogenans* (Rutgers Collection 130) utilizing conventional techniques. Thus, when the starting steroid in my process is a $\Delta^5$-3$\beta$,11$\beta$-diol, e.g., 17$\alpha$-methyl-5-androstene-3$\beta$,11$\beta$,17$\beta$-triol, after protection of the 3-hydroxy group by esterification with acetic acid in pyridine followed by formation of the 11-nitrite ester with nitrosyl chloride in pyridine, the resulting di-ester, e.g., 17$\alpha$-methyl-5-androstene-3$\beta$,11$\beta$,17$\beta$-triol 3-acetate 11-nitrite, is irradiated with ultraviolet light and the resulting 11$\beta$-hydroxy-19-oximino derivative (C), e.g., 17$\alpha$-methyl-19-oximino-5-androstene-3$\beta$,11$\beta$,17$\beta$-triol 3-acetate, is isolated utilizing techniques such as set forth above. Treatment of the aforementioned 19-oximino derivative with nitrous acid results in the formation of the hemiacetal intermediate (D), e.g., 11$\beta$,19-oxido-17$\alpha$-methyl-5-androstene-3$\beta$,17$\beta$,19-triol 3-acetate which is converted to the $\Delta^4$-3-keto-(11→19)-hemiacetal key intermediate (E), e.g., 11$\beta$,19-oxido-17$\alpha$-methyl-4-androstene-17$\beta$,19-diol-3-one, by the action of the microorganism *Flavobacterium dehydrogenans*. Reactions with methanolic sodium hydroxide converts the $\Delta^4$-3-keto-(11→19)-hemiacetal (E) to an 11-formyloxy-19-nor-5(10)-dehydro androstane of this invention, e.g., 17$\alpha$-methyl-19-nor-5(10)-androstene-11$\beta$,17$\beta$-diol-3-one 11-formate which is hydrolyzed to the corresponding diol, e.g., 17$\alpha$-methyl-19-nor-5(10)-androstene-11$\beta$,17$\beta$-diol-3-one, by means of a molar equivalent of of dilute aqueous sodium hydroxide in dioxane.

Alternatively, in my process as described hereinabove when a 3$\beta$,11$\beta$-dihydroxy-$\Delta^5$-androstene is converted to a 3-keto-11$\beta$-hydroxy-19-nor-5(10)-androstene, the conversion of the 3$\beta$-acetoxy-$\Delta^5$-(11$\beta$→19)-hemiacetal intermediate (D) to the 3-keto-$\Delta^4$-(11$\beta$→19)-hemiacetal, key intermediate (E) may also be effected chemically by first protecting the 19-hydroxy group in the hemiacetal function through the formation of the corresponding ether, for example, then removing the 3-acetate group by alkaline hydrolysis followed by oxidation of the resulting 3$\beta$-hydroxyl group to the 3-ketone function. The protective 19-ether function is then removed by the action of a trace of acid in dioxane. The resultant 3-keto-$\Delta^5$-(11→19)-hemiacetal may be converted to the corresponding 3-keto-$\Delta^4$-(11→19)-hemiacetal key intermediate (E) by the action of additional acid over a period of time or by treatment with alkali. Referring to my process as described in the preceding paragraph, the conversion of intermediate D to E may be effected chemically in the following manner. The hemiacetal (D), e.g., 11$\beta$,19-oxido-17$\alpha$-methyl-5-androstene-3$\beta$,17$\beta$,19-triol 3-acetate is converted to the corresponding 19-methyl ether by the action of a trace of hydrochloric acid for example, in methanol to give 11$\beta$,19-oxido-17$\alpha$-methyl-5-androstene-3$\beta$,17$\beta$,19-triol 3-acetate 19-methyl ether. The 3-acetate is removed by alkaline hydrolysis utilizing known techniques and the resulting 11$\beta$,19-oxido,-17$\alpha$-methyl-5-androstene-3$\beta$,17$\beta$ 19-triol 19-methyl ether is oxidized by means of the Jones reagent (i.e., chromic acid/sulfuric acid/acetone) to give 11$\beta$,19-oxido-17$\alpha$-methyl-5-androstene-17$\beta$,19-diol-3-one 19-methyl ether. Removal of the 19-ether group is accomplished by reaction with aqueous dioxane and a trace of acid (hydrochloric acid for example) yielding 11$\beta$,19-oxido-17$\alpha$-methyl-5-androstene-17$\beta$,19-diol-3-one. Conversion of the $\Delta^5$-bond to the $\Delta^4$- bond is effected by means of alkali to give the desired key intermediate, E, i.e., 11β,19-oxido-17α-methyl-4-androstene-17β,19-diol-3-one.

In my process as exemplified in Table I and as described hereinabove, it is to be noted that in order to obtain an 11β-formyloxy-19-nor-5(10)-dehydro steroid of this invention (exemplified as compound F in Table I) from the (11β→19)-hemiacetal intermediate it is necessary that the Δ⁴-3-keto system be present in the (11→19)-hemiacetal key intermediate (shown as compound E in Table I). Thus, removal of any ketal or ester protective groupings at the 3-position in the steroid molecule and conversion of a Δ⁵-bond, if present, to a Δ⁴-bond is preferentially effected after formation of the (11→19)-hemiacetal and must be effected prior to isomerization of the (11→19)-hemiacetal (E) with alcoholic solution of base to form an 11β-formyloxy-19-nor-5(10)-dehydro steroid of this invention. On the other hand, groupings present elsewhere in the steroidal molecule, such as a (17,20), (20,21)-bismethylene derivative, a 21-acyloxy group, or a 20-ethylene ketal, need not be removed prior to conversion to a 19-nor-5(10)-dehydro steroid of this invention. Thus, for example, the hemiacetal intermediate 11β,19-oxido-5-pregnene-19,21-diol-3,20-bis-ethylene ketal 21-acetate, prepared as described in Example 2A of this application, upon treatment with hydrochloric acid in dioxane yields 11β,19-oxido-4-pregnene-19,21-diol-3-one-20-etylene ketal 21-acetate which upon reaction with methanolic sodium hydroxide according to my process yields the novel compound, 11β-formyloxy-19-nor-5(10)-pregnene-21-ol-3-one-20-ethylene ketal 21-acetate.

The novel-3-keto-11β-hydroxy-19-nor-Δ⁵⁽¹⁰⁾-dehydro steroids of this invention such as are defined by formula I possess pharmacological activities similar to those possessed by the corresponding 3-keto-11β-hydroxy-C-19-Δ⁴-steroids. Thus, a 19-nor-Δ⁵⁽¹⁰⁾-pregnane of formula I having a cortical side chain at C-17 (i.e., those steroids wherein Z is

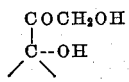

and esters thereof) possess corticoid activity; specifically, 19-nor-5(10)-pregnene-11β,17α,21-triol-3,20-dione has corticoid activity similar to that of hydrocortisone (4-pregnene-11β,17α,21-triol-3,20-dione) and may be used as an anti-inflammatory agent. Similarly, those steroids of Formula I wherein

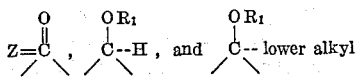

possess androgenic activity and are useful in those indications requiring an androgenic agent such as testosterone propionate (Oreton). Compounds of Formula I wherein

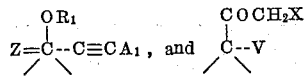

X being hydrogen or halogen, possess progestational activity similar to that possessed by progesterone or 17α-ethinyl-testosterone (ethisterone) and may be used to treat indications requiring a progestational agent.

Specifically, 17α-ethinyl-19-nor-5(10)-androstene-11β,17β-diol-3-one and its analogs and derivatives are useful in the treatment of menstrual disorders and may be used in conjunction with ethinyl estradiol 3-methyl ether in composition forms similar to those containing 17α-ethinyl-19-nor-5(10)-androstene-17β-ol-3-one.

In addition to being therapeutically valuable per se, my novel 19-nor-5(10)-dehydro steroids are valuable as intermediates in the preparation of other steroids known to be pharmacologically valuable. For example, the 3-keto-11β-hydroxy-19-nor-5(10)-dehydro steroids of my invention under mildly acidic conditions are convertible to the corresponding 3-keto-19-nor-4,9(10)-bis-dehydro steroids, known to possess therapeutic activity, e.g., 17α-ethinyl-19-nor-5(10)-androstene-11β,17β-diol-3-one treated with perchloric acid in dioxane at room temperature is converted to 17α-ethinyl-19-nor-4,9-androstadiene-17β-ol-3-one which possesses antifertility activity. Additionally, the 11β-hydroxy-19-nor-Δ⁵⁽¹⁰⁾-dehydro steroids of my invention may be converted to the corresponding 9(11)-dehydro derivatives by utilizing techniques known in the art such as by treatment with phosphorus oxychloride or thionyl chloride in pyridine. Thus, 19-nor-5(10)-androstene-11β,17β-diol-3-one upon treatment with phosphorus oxychloride in pyridine is converted to 19-nor-5(10),9(11)-androstadiene-3-one useful as an anabolic agent as described in Belgian Patent No. 606,685.

The preferred species of the compounds of my invention are those having an 11-formyloxy group at C-11 since, in addition to being therapeutically valuable per se, they are valuable as intermediates in preparing the 11-hydroxy compounds of Formula I, which, in turn, are valuable intermediates in preparing other therapeutically valuable steroids as described hereinabove.

It is to be understood that my process is not limited to the conversion of 3-oxygenated-11β-hydroxy-4-dehydro and 5-dehydrosteroids of the pregnane and androstane series to the corresponding 3-keto-11β-hydroxy-Δ⁵⁽¹⁰⁾-pregnanes or androstanes but is applicable to all C-19-steroids having a 3-keto and an 11β-hydroxy group and having either a 4-dehydro or 5-dehydro bond while being devoid of other unsaturations in the A-ring. Thus, for example, 11-keto-diosgenin (3β-hydroxy-22a,25D-5-spirostene-11-one) after reduction of the 11-keto group with sodium borohydride to yield 11β-hydroxydiosgenin is convertible by my process to 3-keto-22a,25D-19-nor-5(10)-spirostene-11β-ol- and the 11-formate ester thereof. Similarly, 4-cholestene-3,11-dione upon conversion to the corresponding 3-ethylene ketal derivative followed by reduction with lithium aluminium hydride utilizing known techniques to yield the corresponding 11β-hydroxy derivative, i.e., 5-cholestene-11β-hydroxy-3-ethylene ketal, is convertible by my process to 19-nor-5(10)-cholestene-11β-ol-3-one and the 11-formate ester thereof.

The instant application is a continuation-in-part of my co-pending applications, Serial Nos. 95,490 and 113,086, filed March 14, 1961 and May 21, 1961, respectively, each of which in turn is a continuation-in-part of my application, Serial No. 19,444, filed April 4, 1960, now abandoned.

The following are examples which illustrate my invention. It is to be understood that the invention is not to be limited to the exact details of operation or exact compounds shown and described, as obvious modifications and equivalents will be apparent to one skilled in the art; the invention is therefore to be limited only by the scope of the appended claims.

*Example 1.—19-oximino-5-pregnene-11β,21-diol-3,20-bis-ethylene ketal 21-acetate*

A. *5-pregnene-11β,21-diol-3,20-bis-ethylene ketal 11-nitrite 21-acetate.*—Add 70 ml. of pyridine and 35 ml. of acetic anhydride to 5-pregnene-11β,21-diol-3,20-bis-ethylene ketal and allow the mixture to stand at room temperature for 20 hours. Add the reaction mixture to about 750 ml. of ice water and extract with methylene chloride. Combine the methylene chloride extracts and distill to a residue of substantially 5-pregnene-11β,21-diol-3,20-bis-ethylene ketal 21-acetate.

Dissolve the monoacetate prepared in the preceding paragraph in 75 ml. of pyridine then, with stirring, add dropwise a 1% solution of nitrosyl chloride in pyridine until the solution is a brown color which remains unchanged. Allow the reaction mixture to stand for 1 hour, then add about 4 liters of water. A light brown gum separates which is removed by decantation and filtration.

Dissolve the gum in methylene chloride and distill the methylene chloride solution in vacuo to a small volume. Chromatograph the resultant residue on Florisil eluting with hexane, hexane-ether, ether, ether-methylene chloride and methylene chloride. Combine those fractions (in this instance, the early fractions) which show a positive nitrite test (i.e., a purple-blue color) with the reagent, diphenylamine in hydrochloric acid. Distill the combined fractions in vacuo to a residue of substantially 5-pregnene-11β,21-diol-3,20-bis-ethylene ketal 11-nitrite 21-acetate. Purify by crystallization from methylene chloride-hexane, M.P. 134–137° C.

B. *19-oximino-5-pregnene-11β,21-diol-3,20-bis-ethylene ketal 21-acetate.*—Irradiate for 2 hours a solution of 18.9 grams of 5-pregnene-11β,21-diol-3,20-bis-ethylene ketal 11-nitrite 21-acetate in 200 ml. of toluene at about 30° C. by means of a 200 watt Hanovia high pressure mercury arc lamp. Concentrate the reaction solution in vacuo to about one-third the original volume, cool, filter, then set aside the crystalline solid, which is 18-oximino-5-pregnene-11β,21-diol-3,20-bis-ethylene ketal 21-acetate. Chromatograph the filtrate on 500 grams of alumina eluting with ether/methylene chloride.

Combine the last fractions and concentrate to a residue comprising substantially 19-oximino-5-pregnene-11β,21-diol-3,20-bis-ethylene ketal 21-acetate, which is used without purification in Example 2 immediately following.

*Example 2.—11β,19-oxido-4-pregnene-19,21-diol-3,20-dione*

A. *11β,19-oxido-5-pregnene-19,21-diol-3,20-bis-ethylene ketal 21-acetate.*—To 11.5 grams of 19-oximino-5-pregnene-11β,21-diol-3,20-bis-ethylene ketal 21-acetate (prepared as described in Example 1B) at room temperature add a mixture of 170 ml. of glacial acetic acid and 85 ml. of 5% aqueous sodium nitrite. Allow the solution to stand for 10 minutes then extract with methylene chloride. Combine the methylene chloride extracts and distill the methylene chloride in vacuo to a residue of substantially 11β,19-oxido-5-pregnene-19,21-diol-3,20-bis-ethylene ketal 21-acetate. Purify by crystallization from acetone; M.P. 269–275° C.

B. *11β,19-oxido-5-pregnene-19,21-diol-3,20-bis-ethylene ketal.*—Reflux for 15 minutes a mixture of 250 mg. of 11β,19-oxido-5-pregnene-19,21-diol-3,20-bis-ethylene ketal 21-acetate in 50 ml. of methanol and 10 ml. of 5% aqueous sodium hydroxide. Dilute the reaction mixture with water, and extract the aqueous mixture with methylene chloride. Distill the combined methylene chloride extracts in vacuo to a residue of substantially 11β,19-oxido-5-pregnene-19,21-diol-3,20-bis-ethylene ketal. Purify by crystallization from ethyl acetate; M.P. 259–260° C.

C. *11β,19-oxido-4-pregnene-19,21-diol-3,20-dione.*—To the 11β,19-oxido-5-pregnene-19,21-diol-3,20-bis-ethylene ketal prepared in Example 2B, add 133 ml. of dioxane containing 15 ml. of 1 N hydrochloric acid. Allow the mixture to stand at room temperature for 22 hours, then add a dilute, aqueous solution of sodium bicarbonate and extract with methylene chloride. Evaporate the combined methylene chloride extracts in vacuo to a residue of substantially 11β,19-oxido-4-pregnene-19,21-diol-3,20-dione.

*Example 3.—19-nor-5(10)-pregnene-11β,21-diol-3,20-dione*

A. *19-nor-5(10)-pregnene-11β,21-diol-3,20-dione 11-formate.*—To a solution of 0.5 gram of 11,19-oxido-4-pregnene-19,21-diol-3,20-dione (the compound of Example 2C) in 100 ml. of methanol at room temperature, add a solution of 0.3 ml. of 0.5 N sodium hydroxide in methanol, following the disappearance of the 246 mμ ultraviolet absorption band. When the 246 mμ absorption band has reached a minimum (about 10 minutes) add 0.2 ml. of acetic acid and concentrate this solution in vacuo to a residue. Add water to the residue and extract with methylene chloride. Distill the combined methylene chloride extracts in vacuo to a residue which is chromatographed on alumina. Combine the crystalline fractions and recrystallize from methylene chloride-ethyl acetate-hexane, yielding 19-nor-5(10)-pregnene-11β,21-diol-3,20-dione 11-formate.

B. *19-nor-5(10)-pregnene-11β,21-diol-3,20-dione.*—To 250 mgm. of the 11-formate prepared in Example 3A, add 50 ml. of dioxane and a molar equivalent of sodium hydroxide in a 5% aqueous solution. Leave the mixture overnight at room temperature, then bring to neutrality by the dropwise addition of dilute, aqueous acetic acid, then extract with methylene chloride. Distill the combined methylene chloride extracts in vacuo to a residue of substantially 19-nor-5(10)-pregnene-11β,21-diol-3,20-dione. Purify by crystallization from ethyl acetate.

*Example 4.—19-nor-5(10)-pregnene-11β,21-diol-3-one-20-ethylene ketal and the 11β-formate 21-acetate diester thereof*

A. *11β,19-oxido-4-pregnene-19,21-diol-3-one 20-ethylene ketal 21-acetate.*—To 2 grams of 11β,19-oxido-5-pregnene-19,21-diol-3,20-bis-ethylene ketal 21-acetate (the compound of Example 2A) add 133 ml. of dioxane and 15 ml. of 1 N hydrochloric acid. Allow the mixture to stand at room temperature for 20 hours then cautiously add the reaction mixture to dilute, aqueous sodium bicarbonate. Extract the aqueous mixture with methylene chloride. Combine the methylene chloride extracts and distill in vacuo to a residue of substantially 11β,19-oxido-4-pregnene-19,21-diol-3-one-ethylene ketal 21-acetate. Purify by crystallization from ethyl acetate; M.P. 170–186° C.

B. *19-nor-5(10)-pregnene-11β,21-diol-3-one-20-ethylene ketal 11-formate 21-acetate.*—To a solution of 100 mg. of 11β,19-oxido-4-pregnene-19,21-diol-3-one-20-ethylene ketal 21-acetate in 100 ml. of methanol at room temperature add about 0.1 ml. of 0.5 N sodium hydroxide in methanol. Follow the disappearance of the 246 mμ absorption band in the ultraviolet spectra (about 30 minutes) then add a few (about 5) drops of acetic acid. Concentrate the solution in vacuo to a residue, add water to the residue and extract with methylene chloride. Distill the combined methylene chloride extracts in vacuo to a residue of substantially 19-nor-5(10)-pregnene-11β,21-diol-3-one 20-ethylene ketal 11-formate 21-acetate. Purify by crystallization from methanol then from ethyl acetate-hexane; M.P. 51–155° C.

C. *19-nor-5(10)-pregnene-11β,21-diol-3-one-20-ethylene ketal.*—Hydrolyze 19-nor-5(10)-pregnene-11β,21-diol-3-one-20-ethylene ketal 11-formate 21-acetate by means of sodium hydroxide in aqueous dioxane in a manner similar to that described in Example 2B whereby is obtained 19-nor-5(10)-pregnene-11β,21-diol-3-one-20-ethylene ketal.

*Example 5.—19-oximino-5-androstene-11β,17β-diol-3-ethylene ketal 17-acetate and the 17α-methyl analog thereof*

A. *5-androstene-11β,17β-diol-3-ethylene ketal.*—To 75 grams of 11β-hydroxytestosterone in 3 liters of benzene add 300 ml. of ethylene glycol and 1.05 grams of p-toluenesulfonic acid monohydrate. Reflux vigorously for 5 hours into a reflux condenser fitted with a moisture trap. Cool the solution and add dilute, aqueous sodium bicarbonate. Separate the organic solution from the aqueous layer then extract the aqueous solution with benzene, combining the benzene extracts with the original benzene solution. Dry the benzene solution over sodium sulfate and distill to a residue of substantially 5-androstene-11β,17β-diol-3-ethylene ketal.

B. *5-androstene-11β,17β-diol-3-ethylene ketal 11-nitrate 17-acetate.*—In a manner similar to that described in Example 1A, acetylate the 17-hydroxyl group of 5-androstene-11β,17β-diol-3-ethylene ketal by means of acetic anhydride and pyridine and then treat the 5-androstene-11β,17β-diol-3-ethylene ketal 17-acetate thereby formed with nitrosyl chloride in the described manner, thereby obtaining 5-androstene-11β,17β-diol-3-ethylene ketal 11-nitrite 17-acetate.

C. *19 - oximino-5-androstene-11β,17β - diol-3-ethylene ketal 17-acetate.*—In a manner similar to that described in Example 1B, irradiate a toluene solution of 5-pregnene-11β,17β-diol-3-ethylene ketal 11-nitrate 17-acetate by means of a 200 watt Hanovia mercury arc lamp whereby is obtained a mixture of 18-oximino-5-pregnene-11β,17β-diol-3-ethylene ketal 17-acetate and 19-oximino-5-androstene-11β,17β-diol-3-ethylene ketal 17-acetate. Isolate the 19-oximino derivative in the manner described in Example 1B and use without further purification in the procedure immediately following in Example 6.

Utilizing procedures similar to those outlined in above Examples 5B and 5C, (1) react 11β-hydroxy-17α-methyl-testosterone with ethylene glycol and p-toluenesulfonic acid in benzene thereby obtaining 17α-methyl-5-androstene-11β,17β diol-3-ethylene ketal; (2) prepare the 11-nitrite ester by means of nitrosyl chloride; then (3) irradiate the resulting 17α-methyl-5-androstene-11β,17β-diol-3-ethylene ketal 11-nitrite in toluene with ultraviolet light; and (4) separate the resulting mixture of 18-oximino- and 19-oximino- derivatives, whereby is obtained 17α - methyl-19-oximino-5-androstene-11β,17β-diol-3-ethylene ketal.

*Example 6.—19-nor-5-(10)-androstene-11β,17β-diol-3-one and the 17α-methyl analog thereof*

A. *11β,19 - oxido-5-androstene-17β,19-diol-3-ethylene ketal 17-acetate.*—In a manner similar to that described in Example 2A, allow the compound, 19-oximino-5-androstene-11β,17β-diol-3-ethylene ketal 17-acetate (the compound of Example 5C) to react with glacial acetic acid and aqueous sodium nitrite whereby is obtained 11β,19-oxido-5-androstene-17β,19-diol-3-ethylene ketal 17- acetate.

Similarly, 17α - methyl-19-oximino-5-androstene-11β,17β-diol-3-ethylene ketal upon reaction with acetic acid and aqueous sodium nitrite yields 11β,19-oxido-5-androstene-17β,19-diol-3-ethylene ketal.

B. *11β,19-oxido-4-androstene-17β,19-diol-3-one 17-acetate.*—In a manner similar to that described in Example 2C, allow 11β,19-oxido-5-androstene-17β,19-diol-3-ethylene ketal 17-acetate to react with hydrochloric acid in dioxane whereby is obtained 11β,19-oxido-4-androstene-17β,19-diol-3-one 17-acetate.

Similarly, 11β,19-oxido-17α-methyl-5-androstene-17β,19-diol-3-ethylene ketal upon reaction with hydrochloric acid in dioxane in the above manner yields 11β-19-oxido-17α-methyl-4-androstene-17β,19-diol-3-one.

C. *19-nor-5(10)-androstene-11β,17β-diol-3-one 11-formate 17-acetate.*—In a manner similar to that described in Example 3A allow 11β,19-oxido-4-androstene-17β,19-diol-3-one 17-acetate to react with methanolic sodium hydroxide followed by acetic acid and isolate the resultant product in the described manner whereby is obtained 19-nor-5(10)-androstene-11β,17β-diol-3-one 11-formate 17-acetate.

Similarly, 11β,19 - oxido - 17α - methyl - 4 - androstene - 17β,19-diol-3-one upon reaction with methanolic sodium hydroxide followed by acetic acid yields 17α-methyl-19-nor-5(10)-androstene-11β,17β-diol-3-one 11-formate.

D. *19 - nor - 5(10) - androstene - 11β,17β - diol - 3 - one.*—In a manner similar to that described in Example 2B hydrolyze 19-nor-5(10)-androstene-11β,17β-diol-3-one 11-formate 17-acetate by means of sodium hydroxide in aqueous dioxane whereby is obtained 19-nor-5(10)-androstene-11β,17β-diol-3-one 17-acetate.

Similarly, 17α - methyl - 19 - nor - 5(10) - androstene - 11β,17β-diol-3-one 11-formate, upon reaction with sodium hydroxide in aqueous dioxane yields 17α-methyl-19-nor-5(10)-androstene-11β,17β-diol-3-one.

*Example 7.—19-nor-5(10)-pregnene-11β,17α,21-triol-3,20-dione*

A. *5 - pregnene - 11β,17α,21 - triol - 20 - one 3 - ethylene ketal 21-acetate.*—Treat hydrocortisone 21-acetate with ethylene glycol and p-toluenesulfonic acid in a manner similar to that described in Example 5A. Isolate the resultant compound in the described manner to obtain 5-pregnene-11β,17α,21-triol-20-one 3-ethylene ketal 21-acetate.

B. *5-pregnene-11β,17α,21-triol-20-one 3-ethylene ketal 11-nitrite 12-acetate.*—Allow 5-pregnene-11β,17α,21-triol-20-one 3-ethylene ketal 21-acetate to react with nitrosyl chloride in pyridine in a manner similar to that described in Example 1A. Isolate the resultant compound as described whereby is obtained 5-pregnene-11β,17α,21-triol-20-one 3-ethylene ketal 11-nitrite 21-acetate.

C. *19 - oximino - 5 - pregnene - 11β,17α,21 - triol - 20-one 3-ethylene ketal 21-acetate.*—Irradiate with a 200 watt Hanovia mercury lamp a toluene solution of 5-pregnene-11β,17α,21-triol-20-one 3-ethylene ketal 11-nitrite 21-acetate in a manner similar to that described in Example 1C. Separate the resulting 18-oximino- and 19-oximino-derivatives in the described manner, whereby is obtained 19 - oximino - 5 - pregnene - 11β,17α,21 - triol-20-one 3-ethylene ketal 21-acetate.

D. *11β,19 - oxido - 5 - pregnene - 17α,19,21 - triol - 20-one 3-ethylene ketal 21-acetate.*—In a manner similar to that described in Example 2A, allow 19-oximino-11β,17α,21-triol-20-one 3-ethylene ketal 21-acetate to react with glacial acetic acid and sodium nitrite and isolate the resultant product in the described manner whereby is obtained 11β,19-oxido-5-pregnene-17α,19,21-triol-20-one 3-ethylene ketal 21-acetate.

E. *11β,19 - oxido - 4 - pregnene - 17α,19,21 - triol - 3,20-dione 21-acetate.*—Treat 11β,19-oxido-5-pregnene-17α,19,21-triol-20-one 3-ethylene ketal 21-acetate with hydrochloric acid in dioxane in a manner similar to that described in Example 2C. Isolate the resultant compound in the described manner to obtain 11β,19-oxido-4-pregnene-17α,19,21-triol-3,20-dione 21-acetate.

F. *19 - nor - 5(10) - pregnene - 11β,17α,21 - triol - 3,20-dione 11-formate 21-acetate.*—In a manner similar to that described in Example 3A, allow 11β,19-oxido-4-pregnene - 17α,19,21 - triol - 3,20 - dione 21 - acetate to react with methanolic sodium hydroxide followed by acetic acid. Isolate the resultant compound in the described manner whereby is obtained 19-nor-5(10)-pregnene-11β,17α,21-triol-3,20-dione 11-formate 21-acetate.

G. *19 - nor - 5(10) - pregnene - 11β,17α,21 - triol - 3,20 - dione.*—Hydrolyze 19 - nor - 5(10) - pregnene - 11β,17α,21-triol-3,20-dione 11-formate 21-acetate with aqueous sodium hydroxide in the manner similar to that described in Example 2B. Isolate the resultant product in the described manner whereby is obtained 19-nor-5(10) - pregnene - 11β,17α,21 - triol - 3,20 - dione.

*Example 8.—16-substituted-19-nor-5(10)-pregnene-11β,21-diol-3,20-dione*

A. *16 - substituted - 5 - pregnene - 11β,21 - diol - 20 - one 3-ethylene ketal 11-nitrite 21-acetate.*—By following procedures similar to those described in Examples 5A and 1A, react 4-pregnene-11β,16α,21-triol-3,20-dione-16,21-diacetate with ethylene glycol and p-toluene-sulfonic acid monohydrate, then esterify the resulting 5-pregnene-11β,16α,21-triol-20-one 3-ethylene oxide 16,21-diacetate utilizing nitrosyl chloride in pyridine whereby is obtained the corresponding 11-nitrite ester.

In a similar manner, 16α-methyl-4-pregnene-11β,21-diol-3,20-dione 21-acetate and the 16β-epimer thereof are each reacted first with ethylene glycol thereby obtaining 16α-methyl-5-pregnene-11β,21-diol-20-one 3-ethylene ketal 21-acetate and the 16β-epimer thereof, respectively, which in turn, are each reacted with nitrosyl chloride in pyridine to obtain 16α-methyl-5-pregnene-11β,21-diol-20-one 3- ethylene ketal 11-nitrite 21-acetate, and the 16β-epimer thereof, respectively.

B. *16 - substituted - 19 - oximino - 5 - pregnene - 11β, 21-diol-20-one 3-ethylene ketal 21-acetate.*—In a manner similar to that described in Example 1B, irradiate with ultraviolet light by means of a 200 watt Hanovia mercury arc lamp a toluene solution of 5-pregnene-11β,16α,21-triol-20-one 3-ethylene ketal 11-nitrite 16,21-diacetate and separate the resulting mixture of 18-oximino- and 19-oximino - 5 - pregnene - 11β,16α,21 - triol - 20 - one 3 - ethylene-ketal 16,21-diacetate utilizing chromatographic techniques whereby there is obtained 19-oximino-5-pregnene-11β,16α,21-triol-20 - one 3 - ethylene ketal 16,21-diacetate.

Similarly, irradiation by means of a 200 watt Hanovia mercury arc lamp of toluene solutions of 16α-methyl-5-pregnene-11β,21-diol-20-one 3-ethylene ketal 11-nitrite 21-acetate and 16β-methyl-5-pregnene-11β,21-diol-20-one 3-ethylene ketal 11-nitrite 21-acetate, respectively, according to the techniques of Example 1B will yield the respective 19-oximino- derivatives 16α-methyl-19-oximino-5-pregnene-11β,21-diol-20-one 3-ethylene ketal 21-acetate and 16β-methyl-19-oximino-11β,21-diol-20-one 3-ethylene ketal 21-acetate.

C. *16 - substituted - 11β,19 - oxido - 5 - pregnene - 19,21-diol-20-one 3-ethylene ketal 21-acetate.*—Treat 19-oximino - 5 - pregnene - 11β,16α,21 - triol - 20 - one 3-ethylene ketal 16,21-diacetate with glacial acetic acid and aqueous sodium nitrite in a manner similar to that described in Example 2A whereby is obtained 11β,19-oxido - 5 - pregnene - 16α,19,21 - triol - 20 - one 3 - ethylene ketal 16,21-diacetate.

Similarly, 16α-methyl-19-oximino-5-pregnene-11β,21-diol-20-one 3-ethylene ketal 21-acetate and the 16β-methyl epimer thereof are each reacted with sodium nitrite and acetic acid to obtain 11β,19-oxido-16α-methyl-5-pregnene-19,21-diol-20-one 3-ethylene ketal 21-acetate and 11β,19-oxido-16β-methyl-5-pregnene-19,21-diol-20-one 3-ethylene ketal 21-acetate.

D. *16-substituted-11β,19-oxido-4-pregnene-19,21-diol-3,20-dione 21-acetate.*—Treat 11β,19-oxido-5-pregnene-16α,19,21-triol-20-one 3-ethylene ketal 16,21-diacetate with hydrochloric acid in dioxane in a manner similar to that described in Example 2C, whereby is obtained 11β,19-oxido-4-pregnene-16α,19,21-triol-3,20-dione 16,21-diacetate.

Similarly, 11β,19-oxido-16α-methyl-5-pregnene-19,21-diol-20-one 3-ethylene ketal 21-acetate and the 16β-methyl epimer thereof are each reacted with hydrochloric acid in dioxane whereby is obtained 11β,19-oxido-16α-methyl-4-pregnene-19,21-diol-3,20-dione 21-acetate and 11β,19-oxido - 16β - methyl - 4 - pregnene - 19,21-diol-3,20-dione 21-acetate.

E. *16-substituted-19-nor-5(10)-pregnene-11β,21-diol-3, 20-dione 11-formate 21-acetate.*—Treat 11β,19-oxido-4-pregnene-16α,19,21-triol-3,20-dione 16,21-diacetate with sodium hydroxide in methanol and then acetic acid according to the procedure of Example 3A. Isolate the resultant produce utilizing chromatographic techniques similar to those described in Example 3A, whereby is obtained 19-nor-5(10)-pregnene-11β,16α,21-triol-3,20-dione 11-formate 16,21-diacetate.

In a similar manner, 11β,19-oxido-16α-methyl-4-pregnene-19,21-diol-3,20-dione 21-acetate and the 16β-methyl epimer thereof are each reacted with methanolic sodium hydroxide and then acetic acid, and the resultant products isolated by chromatographic techniques whereby is obtained 16α - methyl - 19-nor-5(10)-pregnene-11β,21-diol-3,20-dione 11-formate 21-acetate and 16β-methyl-19-nor-5(10) - pregnene-11β,21-diol-3,20-dione 11-formate 21-acetate.

F. *16-substituted-19-nor-5(10)-pregnene-11β,21-diol-3, 20-dione.*—In a manner similar to that described in Example 2B hydrolyze by means of sodium hydroxide in aqueous dioxane each of 19-nor-5(10)-pregnene-11β,16α, 21-triol-3,20-dione 11-formate 16,21-diacetate, 16α-methyl-19-nor-5(10)-pregnene-11β,21-diol-3,20-dione 11-formate 21-acetate and the 16β-methyl epimer thereof whereby is obtained respectively, 19-nor-5(10)-pregnene-11β,16α,21-triol-3,20-dione 16α,21-diacetate, 16α-methyl-19 - nor - 5(10)-pregnene-11β,21-diol-3,20-dione 21-acetate and 16β-methyl-19-nor-5(10)-pregnene-11β,21-diol-3,20-dione 21-acetate.

*Example 9.*—*19-nor-5(10)-pregnene-11β-ol-3,20-dione*

A. *5 - pregnene - 11β-ol-3,20-bis-ethylene ketal 11-nitrite.*—In the manner of Examples 5A and 1A, allow 11β-hydroxy-progesterone to react first with ethylene glycol and p-toluene-sulfonic acid whereby is obtained 11β-hydroxy-5-pregnene-3,20-bis-ethylene ketal, which, in turn, is reacted with nitrosyl chloride in pyridine to obtain 11β-hydroxy-5-pregnene-3,20-bis-ethylene ketal 11-nitrite.

B. *19-oximino-5-pregnene-3,20-bis-ethylene ketal.*—In the manner of Example 1B irradiate with ultraviolet light a toluene solution of 11β-hydroxy-5-pregnene-3,20-bis-ethylene ketal 11-nitrite and utilizing chromatographic techniques similar to those of Example 1B, separate the resulting mixture of 18-oximino- and 19-oximino-derivatives whereby is obtained 19-oximino-5-pregnene-3,20-bis-ethylene ketal.

C. *11β,19 - oxido - 5 - pregnene-19-ol-3,20-bis-ethylene ketal.*—Allow 19 - oximino - 5-pregnene-3,20-bis-ethylene ketal to react with sodium nitrite and acetic acid in a manner similar to that described in Example 2A, whereby is obtained 11β,19-oxido-5-pregnene-19-ol-3,20-bis-ethylene ketal.

D. *11β,19 - oxido-4-pregnene-19-ol-3,20-dione.*—Treat the 3,20-bis-ethylene ketal of Example 9C with hydrochloric acid in dioxane according to the procedure of Example 2C whereby is obtained 11β,19-oxido-4-pregnene-19-ol-3,20-dione.

E. *19 - nor - 5(10)-pregnene-11β-ol-3,20-dione 11-formate.*—Allow 11β,19 - oxido-4-pregnene-19-ol-3,20-dione to react with methanolic sodium hydroxide and then acetic acid according to the procedure of Example 3A whereby is obtained 19-nor-5(10)-pregnene-11β-ol-3,20-dione 11-formate.

F. *19 - nor-5(10)-pregnene-11β-ol-3,20-dione.*—Hydrolyze the 11-formate of Example 9E by means of sodium hydroxide in aqueous dioxane in the manner described in Example 2B whereby is obtained 19-nor-5(10)-pregnene-11β-ol-3,20-dione.

In a similar manner by going through a sequence of reactions similar to those described above, 11β,17α-dihydroxy-progesterone may be converted to 11β,17α-dihydroxy-19-nor-5(10)-pregnene-3,20-dione.

*Example 10.*—*Substituted derivatives of 19-nor-5(10)-pregnene-11β,17α,21-triol-3,20-dione*

In a manner similar to that described in Example 7, 6α-fluorohydrocortisone acetate (6α-fluoro-4-pregnene-11β,17α,21-triol-3,20-dione 21-acetate), 6α-methylhydrocortisone acetate, 16α-methylhydrocortisone acetate, 16β-methylhydrocortisone acetate, 2α-methylhydrocortisone acetate, and 7α-methylhydrocortisone acetate are reacted with ethylene glycol and p-toluenesulfonic acid to give respectively, 6-fluoro-5-pregnene-11β,17α,21-triol-20-one-3-ethylene ketal 21-acetate, 6-methyl-5-pregnene-11β,17α,21-triol-20-one-3-ethylene ketal 21-acetate, 16α-methyl - 5 - pregnene - 11β,17α,21 - triol-20-one-3-ethylene ketal 21-acetate, 16β-methyl-5-pregnene-11β,17α,21-triol-20-one-3-ethylene ketal 21-acetate, 2α-methyl-5-pregnene-11β,17α,21-triol-20-one-3-ethylene ketal 21-acetate, and 7α - methyl-5-pregnene-11β,17α,21-triol-20-one-3-ethylene ketal 21-acetate, which in turn are reacted with nitrosyl chloride in pyridine to give the respective 11-nitrite esters, i.e., 6-fluoro-5-pregnene-11β,17α,21-triol-20-one-3-ethylene ketal 21-acetate 11-nitrite, 6-methyl-5-pregnene-11β,17α,21-triol-20-one-3-ethylene ketal 21-acetate 11-nitrite, 16α - methyl - 5-pregnene-11β,17α,21-triol-20-one-3-ethylene ketal 21-acetate 11-nitrite, 16β-methyl-5-pregnene-11β,17α,21-triol-20-one-3-ethylene ketal 21-acetate 11-nitrite, 2α-methyl-5-pregnene-11β,17α,21-triol-20-one-3-ethylene ketal 21-acetate 11-nitrite and 7α-methyl-5-pregnene-11β,17α,21-triol-20-one-3-ethylene ketal 21-acetate 11-nitrite.

Irradiation of each of the aforementioned nitrite esters in toluene and isolation of the 19-oximino product yields respectively, 6-fluoro-19-oximino-5-pregnene-11β,17α,21-triol-
   20-one-3-ethylene ketal 21-acetate,
6-methyl-19-oximino-5-pregnene-11β,17α,21-triol-20-
   one-3-ethylene ketal 21-acetate,
16α-methyl-19-oximino-5-pregnene-11β,17α,21-triol-
   20-one-3-ethylene ketal 21-acetate,
16β-methyl-19-oximino-5-pregnene-11β,17α,21-triol-
   20-one-3-ethylene ketal,
2α-methyl-19-oximino-5-pregnene-11β,17α,21-triol-
   20-one-3-ethylene ketal 21-acetate and
7α-methyl-19-oximino-5-pregnene-11β,17α,21-triol-
   20-one-3-ethylene ketal 21-acetate, each of which upon treatment with sodium nitrite and glacial acetic acid yields the respective (11→19)-hemiacetal, namely, 6-fluoro-11β,19-oxido-5-pregnene-17α,19,21-triol-
   20-one-3-ethylene ketal 21-acetate,
6-methyl-11β,19-oxido-5-pregnene-17α,19,21-triol-
   20-one-3-ethylene ketal 21-acetate,
16α-methyl-11β,19-oxido-5-pregnene-17α,19,21-triol-
   20-one-3-ethylene ketal 21-acetate,
16β-methyl-11β,19-oxido-5-pregnene-17α,19,21-
   triol-20-one-3-ethylene ketal 21-acetate,
2α-methyl-11β,19-oxido-5-pregnene-17α,19,21-triol-
   20-one-3-ethylene ketal 21-acetate and
7α-methyl-11β,19-oxido-5-pregnene-17α,19,21-triol-
   20-one-3-ethylene ketal 21-acetate, each of which in turn is treated with hydrochloric acid in dioxane to obtain the corresponding δ⁴-3-keto-(11→19)-hemiacetal which are respectively, 6α-fluoro-11β,19-oxido-4-pregnene-17α,19,21-triol-3,
   20-dione 21-acetate,
6α-methyl-11β,19-oxido-4-pregnene-17α,19,21-triol-3,
   20-dione 21-acetate,
16α-methyl-11β,19-oxido-4-pregnene-17α,19,21-triol-3,
   20-dione 21-acetate,
16β-methyl-11β,19-oxido-4-pregnene-17α,19,21-triol-3,
   20-dione 21-acetate,
2α-methyl-11β,19-oxido-4-pregnene-17α,19,21-triol-3,
   20-dione 21-acetate.
7α-methyl-11β,19-oxido-4-pregnene-17α,19,21-triol-3,
   20-dione 21-acetate, Treatment of each of these aforementioned 3-keto-4-pregnene (11β→19)-hemiacetals with methanolic sodium hydroxide and followed by acetic acid yields the following 11-formyloxy-19-nor-5(10) - dehydropregnenes respectively, i.e., 6α-fluoro-19-nor-5(10)-pregnene-11β,17α,21-triol-3,
   20-dione 11-formate 21-acetate,
6α-methyl-19-nor-5(10)-pregnene-11β,17α,21-triol-3,
   20-dione 11-formate 21-acetate,
16α-methyl-19-nor-5(10)-pregnene-11β,17α,21-triol-3,
   20-dione 11-formate 21-acetate,
16β-methyl-19-nor-5(10)-pregnene-11β,17α,21-triol-3,
   20-dione 11-formate 21-acetate,
2α-methyl-19-nor-5(10)-pregnene-11β,17α,21-triol-3,
   20-dione 11-formate 21-acetate, and
7α-methyl-19-nor-5(10)-pregnene-11β,17α,21-triol-3,
   20-dione 11-formate 21-acetate, which upon hydrolysis with 2 molar equivalents of aqueous sodium hydroxide yields the following 11β, 17α,21-triols respectively, 6α-fluoro-19-nor-5(10)-pregnene-11β,17α,21-triol-3,
   20-dione,
6α-methyl-19-nor-5(10)-pregnene-11β,17α,21-triol-3,
   20-dione,
16α-methyl-19-nor-5(10)-pregnene-11β,17α,21-triol-3,
   20-dione,
16β-methyl-19-nor-5(10)-pregnene-11β,17α,21-triol-3,
   20-dione,
2α-methyl-19-nor-5(10)-pregnene-11β,17α,21-triol-3,
   20-dione, and
7α-methyl-19-nor-5(10)-pregnene-11β,17α,21-triol-3,
   20-dione.

*Example 11.—17α-methyl-19-nor-5(10)-androstene - 11β, 17β-diol-3-one*

A. *17α-methyl-5-androstene-3β-11β,17β-triol 3 -acetate 11-nitrite.* — In a manner similar to that described in Example 1A, allow 17α-methyl-5-androstene-3β,11β,17β-triol to react with acetic anhydride in pyridine and isolate the resultant product by means of methylene chloride to give 17α-methyl-5-androstene-3β,11β,17β-triol 3-acetate.

In a manner described in Example 1A, dissolve the monoacetate prepared in the preceding example in pyridine and allow to react with nitrosyl chloride in pyridine. Isolate the resultant product in the described manner and purify by crystallization from methylene chloride-hexane yielding 17α-methyl-5-androstene-3β,11β,17β-triol 3-acetate 11-nitrite.

B. *17α - methyl-19-oximino-5-androstene - 3β,11β,17β-triol 3-acetate.* — In a manner similar to that described in Example 1B, irradiate a toluene solution of 17α-methyl-5-androstene-3β,11β,17β-triol 3-acetate 11-nitrite by means of a 200 watt Hanovia high pressure mercury arc lamp. Separate the resulting 18-oximino product from the 19-oximino product in the described manner, combining the last fractions through the alumina column comprising substantially 17α-methyl-19-oximino-5-androstene-3β,11β,17β-triol 3-acetate, which is used without further purification following Example 11C.

C. *17α - methyl-11β,19-oxido-5-androstene-3β,17β,19-triol 3-acetate.* — In a manner similar to that described in Example 2A, allow the 19-oxime prepared in Example 11B to react with glacial acetic acid and aqueous sodium nitrite and isolate in the described manner to obtain substantially 17α-methyl-11β,19-oxido-5-androstene-3β,17β,-19-triol 3-acetate.

D. *17α-methyl-11β,19-oxido-4-androstene-17β,19 - diol-3-one.* — Subject the 5-androstene-3β-acetate prepared in Example 11C to the action of a culture of *Flavobacterium dehydrogenans* (Rutgers University Collection No. 130) in the following manner:

The culture of the organism is prepared by propagating it in a nutrient agar medium at 30° C. for 24 to 72 hours. During incubation, the inoculated tube is exposed to light with the resultant development of a yellow pigment characteristic of the species. The developed culture is rinsed from an agar slant under sterile conditions into a sterile medium of pH 6.8 and having the following composition:

|  | Gm. |
|---|---|
| Yeast extract (Difco) | 10 |
| Potassium phosphate monobasic | 4.48 |
| Sodium phosphate dibasic | 4.68 |

Tap water to 1 liter.

This culture medium has previously been autoclaved, as at 15 lbs. pressure, for twenty minutes to obtain aseptic conditions, and cooled. The variant is grown in the medium under constant illumination, using the visible range of the spectrum. The incubation temperature is maintained at about 33° C. and is conducted under aerobic conditions. Aeration is accomplished by agitation and/or blowing air through the culture medium.

After the organism has grown for 12 to 24 hours (or longer, if desired), 100 ml. of the growing culture are introduced into each of ten flasks, and to each flask are added 200 mg. of 17α-methyl-11β,19-oxido-5-androstene- 3β,17β,19-triol 3-acetate dissolved in a minimum volume of ethanol. The reaction mixtures are then shaken at 30° C. for 12 to 72 hours. The reaction is stopped when paper chromatography indicates that the starting material has been transformed.

The contents of the flasks are combined and extracted with methylene chloride. The extracts are concentrated and the residue is crystallized from acetone-hexane affording 0.62 g. of 17α-methyl-11β,19-oxido-4-androstene-17β, 19-diol-3-one as a crystalline solid.

E. *17α-methyl-19-nor-5(10)-androstene-11β,17β-diol-3-one 11-formate.*—In a manner similar to that described in Example 3A, allow a methanolic solution of 17α-methyl-11β,19-oxido-5-androstene-17β,19-diol-3-one to react with a methanolic solution of sodium hydroxide followed by acetic acid. Isolate in the described manner to give 17α-methyl - 19 - nor-5(10)-androstene-11β,17β-diol-3-one 11-formate 17-acetate.

F. *17α-methyl-19-nor-5(10)-androstene-11β,17β-diol-3-one.*—In a manner similar to that described in Example 2B, hydrolyze 17α-methyl-19-nor-5(10)-androstene-11β, 17β-diol-3-one 11-formate by means of methanolic sodium hydroxide whereby is obtained 19-nor-5(10)-androstene-11β,17β-diol-3-one.

*Example 12.—19-nor-5(10)-androstene-11β-ol-3,17-dione*

A. *5-androstene-11β-ol-3,17-bis-ethylene ketal 11-nitrite.*—In a manner similar to that described in Example 5A to 7.5 g. of 4-androstene-11β-ol-3,17-dione in 300 ml. of benzene add 60 ml. of ethylene glycol and 0.21 grams of p-toluene sulfonic acid monohydrate. Reflux vigorously for 5 hours into a reflux condenser fitted with a moisture trap. Cool and isolate the desired product in a manner similar to that described whereby is obtained 5-androstene-11β-ol-3,17-bis-ethylene ketal.

Treat the 5 - androstene-11β-ol-3,17-bis-ethylene ketal thereby formed with nitrosyl chloride in pyridine in a manner similar to that described in Example 1A thereby obtaining 5-androstene-11β-ol-3,17-bis-ethylene ketal 11-nitrite.

B. *19 - oximino - 5 - androstene-11β-ol-3,17-bis-ethylene ketal.*—In a manner similar to that described in Example 1B, irradiate a toluene solution of 5-androstene-11β-ol-3, 17-bis-ethylene ketal 11-nitrite by means of a 200 watt Hanovia mercury arc lamp whereby is obtained a mixture of 18-oximino-5-androstene-11β-ol-3,17-bis-ethylene ketal and 19 - oximino - 5 - androstene-11β-ol-3,17-bis-ethylene ketal. Isolate the 19-oximino derivative in a manner described in Example 1B and use without further purification in the following procedure 12C.

C. *11β-19-oxido-5-androstene-19-ol-3,17 - bis-ethylene ketal.*—In a manner similar to that described in Example 2A, allow the compound 19-oximino-5-androstene-11β-ol-3,17-bis-ethylene ketal to react with glacial acetic acid in aqueous sodium nitrite whereby is obtained 11β,19-oxido-5-androstene-19-ol-3,17-bis-ethylene ketal.

D. *11β,19-oxido-4-androstene-19-ol-3,17-dione.*—In a manner similar to that described in Example 2C, allow 11β,19-oxido-5-androstene-19-ol-3,17-bis-ethylene ketal to react with hydrochloric acid in dioxane whereby is obtained 11β,19-oxido-4-androstene-19-ol-3,17-dione.

E. *19 - nor-5(10)-androstene-11β-ol-3,17-dione 11-formate.*—In a manner similar to that described in Example 3A, allow 11β,19-oxido-4-androstene-19-ol-3,17-dione to react with methanolic sodium hydroxide followed by acetic acid and isolate the resultant product in the described manner whereby is obtained 19-nor-5(10)-androstene-11β-ol-3,17-dione 11-formate.

F. *19-nor-5(10) - androstene-11β-ol-3,17-dione.*—In a manner similar to that described in Example 2B hydrolyze 19-nor-5(10)-androstene-11β-ol-3,17-dione 11-formate by means of methanolic sodium hydroxide whereby is obtained 19-nor-5(10)-androstene-11β-ol-3,17-dione.

*Example 13.—6 and 16 substituted-19-nor-5(10)-pregnene-11β,17α-diol 3,20-diones*

A. *6 - substituted-5-pregnene-11β,17α-diol-3,20-bis-ethylene ketal 11-nitrite.*—In a manner similar to that described in Example 9A, allow 6α-chloro-11β,17α-dihydroxyprogesterone to react first with ethylene glycol and p-toluenesulfonic acid whereby is obtained 6-chloro-5-pregnene-11β,17α-diol-3,20-bis-ethylene ketal, which in turn, is allowed to react with nitrosyl chloride in pyridine to obtain 6-chloro-5-pregnene - 11β,17α - diol-3,20-bis-ethylene ketal 11-nitrite.

In a similar manner, 6α-bromo-11β,17α-dihydroxyprogesterone, 6α-methyl-11β,17α-dihydroxyprogesterone and 6α - fluoro-11β,17α-dihydroxy-16α-methylprogesterone are each reacted first with ethylene glycol and p-toluenesulfonic acid whereby is obtained the corresponding 3,20-bis-ethylene ketal derivatives, each of which in turn is allowed to react with nitrosyl chloride in pyridine to give respectively 6-bromo-5-pregnene-11β,17α-diol-3,20-bis-ethylene ketal 11-nitrite, 6-methyl-5-pregnene-11β,17α-diol-3, 20-bis-ethylene ketal 11-nitrite, and 6-fluoro-16α-methyl-5-pregnene-11β,17α-diol-3,20-bis-ethylene ketal 11-nitrite.

B. *6-substituted-19-oximino-5-pregnene-11β,17α-diol-3, 20-bis-ethylene ketals.*—In the manner of Example 1B irradiate with ultraviolet light a toluene solution of 6-chloro-5-pregnene-11β,17α-diol-3,20-bis-ethylene ketal 11-nitrite and utilizing chromatographic techniques separate the resulting mixture of 18-oximino and 19-oximino derivatives whereby is obtained 6-chloro-19-oximino-5-pregnene-11β, 17α-diol-3,20-bis-ethylene ketal.

In a similar manner, irradiate a toluene solution of each of 6 - bromo - 5 - pregnene-11β,17α-diol-3,20-bis-ethylene ketal 11-nitrite, 6-methyl-5-pregnene-11β,17α-diol-3,20-bis-ethylene ketal 11-nitrite and 6-fluoro-16α-methyl-5-pregnene-11β,17α-diol-3,20-bis-ethylene ketal 11-nitrite and utilizing chromatographic techniques separate the resulting mixture of 18-oximino and 19-oximino derivatives whereby is obtained respectively 6-bromo-19-oximino-5-pregnene-11β,17α-diol-3,20-bis-ethylene ketal, 6-methyl-19 - oximino - 5 - pregnene-11β,17α-diol-3,20-bis-ethylene ketal and 6-fluoro-16α-methyl-19-oximino-5-pregnene-11β, 17α-diol-3,20-bis-ethylene ketal.

C. *6-substituted - 11β,19-oxido - 4-pregnene-17α,19-diol-3,20-dione.*—In a manner similar to that described in Examples 9C and 9D, allow 6-chloro-19-oximino-5-pregnene-11β,17α-diol-3,20-bis-ethylene ketal to react with sodium nitrite in acetic acid whereby is obtained 6-chloro - 11β,19-oxido-5-pregnene - 17α,19-diol - 3,20-bis-ethylene ketal, which in turn, is allowed to react with hydrochloric acid in dioxane whereby is obtained 6α-chloro-11β,19-oxido-4-pregnene-17α,19-diol-3,20-dione.

In a similar manner 6-bromo-19-oximino-5-pregnene-11β,17α-diol - 3,20 - bis-ethylene ketal, 6-methyl - 19-oximino-15-pregnene - 11β,17α-diol - 3,20-bis-ethylene ketal, and 6-fluoro-16α-methyl-19-oximino-5-pregnene-11β,17α-diol-3,20-bis-ethylene ketal are each reacted with sodium nitrite in acetic acid yielding respectively, 6-bromo-11β,19-oxido-5-pregnene-17α,19-diol-3,20-bis-ethylene ketal, 6-methyl - 11β,19-oxido-5-pregnene - 17α,19-diol-3,20-bis-ethylene ketal, and 6-fluoro-16α-methyl-11β,-19-oxido-5-pregnene-17α,19-diol-3,20-bis-ethylene ketal which are are each in turn reacted with hydrochloric acid in dioxane to give respectively, 6α-bromo-11β,19-oxido-4-pregnene - 17α,19-diol-3,20-dione, 6α-bromo - 11β,19-oxido-4-pregnene - 17α,19-diol - 3,20-dione, and 6α-fluoro - 16α-methyl-11β,19-oxido-4-pregnene-17α,19-diol-3,20-dione.

D. *6-substituted-11β-formyloxy-19-nor-5(10)-pregnene-17α-ol 3,20-diones.*—In a manner similar to that described in Example 9E, allow each of 6α-chloro-11β,19-oxido - 4-pregnene - 17α,19-diol - 3,20-dione, 6α-bromo-11β,19-oxido - 4-pregnene - 17α,19-diol - 3,20-dione, 6α-methyl-11β,19-oxido-4-pregnene-17α,19-diol - 3,20 - dione and 6α-fluoro-16α-methyl-11β,19-oxido-4-pregnene-3,20-dione to react with methanolic sodium hydroxide and then acetic acid whereby is obtained respectively 6α-chloro-19-nor-5(10)-pregnene-11β,17α-diol-3,20-dione 11-formate, 6α-bromo-19-nor-5(10)-pregnene-11β,17α-diol-3,20-dione 11-formate, 6α-methyl - 19-nor - 5(10)-pregnene-11β,17α-diol-3,20-dione 11-formate, and 6α-fluoro-16α-methyl-19-nor-5(10)-pregnene - 11β,17α - diol - 3,20-dione 11-formate.

E. *6-substituted - 19-nor-5(10)-pregnene - 11β,17α-diol-3,20-diones.*—Hydrolyze each of the 11-formyloxy-19-nor-5(10)-pregnenes prepared in Example 13D by means of aqueous sodium hydroxide in the manner described in Example 2B whereby is obtained respectively, 6α-chloro-19-nor - 5(10)-pregnene - 11β,17α-diol - 3,20-dione, 6α-bromo-19-nor-5(10)-pregnene - 11β,17α-diol-3,20-dione, 6α - methyl-19-nor-5(10)-pregnene - 11β,17α - diol - 3,20-dione, and 6α - fluoro-16α-methyl-19-nor-5(10)-pregnene-11β,17α-diol-3,20-dione.

*Example 14.—Alternate procedure for the preparation of 19-nor-5(10)-pregnene-11β,17α,21-triol-3,20-dione and the 16α-methyl and 16α-ethyl analogs thereof*

A. *5-pregnene-11β,17α,21-triol-3,20-dione 11-nitrite 21-acetate.*—Allow 5-pregnene - 11β,17α,-21-triol-3,10-dione 21-acetate (prepared as described in U.S. Patent No. 2,908,696) to react with nitrosyl chloride in pyridine in a manner similar to that described in Example 1A. Isolate the resultant compound as described whereby is obtained the 5-pregnene-11β-17α,21-triol-3,20-dione 11-nitrite 21-acetate.

In a similar manner, 16α-methyl - 5-pregnene-11β,17α,21-triol-3,20-dione 21-propionate and 16α-ethyl-5-pregnene-11β,17α,21-triol-3,20-dione 21-acetate are each reacted with nitrosyl chloride in pyridine to obtain respectively, 16α-methyl - 5-pregnene-11β,17α,21-triol-3,20-dione 11-nitrite 21-propionate and 16α-ethyl-5-pregnene-11β,17α,21-triol-3,20-dione 11-nitrite 21-acetate.

B. *19-oximino-5-pregnene-11β,17α,21-triol-3,20 - dione 21-acetate.*—Irradiate with a 200 watt Hanovia mercury lamp a toluene solution of 5-pregnene-11β,17α,21-triol-3,20-dione 11-nitrite 21-acetate in a manner similar to that described in Example 1C. Separate the resulting 18-oximino and 19-oximino-derivatives in the described manner whereby is obtained 19-oximino-5-pregnene-11β,17α,21-triol-3,20-dione 21-acetate.

In a similar manner, toluene solutions of each of a 16α-methyl - 5-pregnene - 11β,17α,21-triol-3,20-dione 11-nitrite 21 - propionate and 16α - ethyl - 5 - pregnene-11β,17α,21-triol-3,20-dione 11-nitrite 21-acetate are irradiated with a 200 watt Hanovia mercury lamp and the resultant 18-oximino and 19-oximino products separated via chromatographic techniques whereby is obtained 16α-methyl - 19-oximino - 5-pregnene - 11β,17α,21-triol-3,20-dione 21-propionate and 16α-ethyl-19-oximino-5-pregnene-11β,17α,21-triol-3,20-dione 21-acetate respectively.

C. *11β,19-oxido-5-pregnene-17α,19,21-triol-3,20-dione 21-acetate.*—In a manner similar to that described in Example 2A, allow 19-oximino-5-pregnene-11β,17α,21-triol-3,20-dione 21-acetate to react with glacial acetic acid and sodium nitrite and isolate the resultant product in the described manner whereby is obtained 11β,19-oxido-5-pregnene-17α,19,21-triol-3,20-dione 21-acetate.

In a similar manner, 16α-methyl-19-oximino-5-pregnene-11β,17α,21-triol-3,20-dione 21-propionate and 16α-ethyl-19-oximino-5-pregnene - 11β,17α,21-triol-3,20-dione 21-acetate are each reacted with acetic acid and sodium nitrite to obtain respectively 16α-methyl-11β,19-oxido-5-pregnene - 17α,19,21-triol-3,20-dione 21-propionate and 16α-ethyl-11β,19-oxido-5-pregnene - 17α,19,21-triol-3,20-dione 21-acetate.

D. *11β,19-oxido-4-pregnene-17α,19,21-triol-3,20-dione 21-acetate.*—Treat 11β,19-oxido - 5-pregnene - 17α,19,21-triol-3,20-dione 21-acetate with hydrochloric acid in dioxane in a manner similar to that described in Example 2C. Isolate the resultant compound in the described manner to obtain 11β,19-oxido-4-pregnene-17α,19,21-triol-3,20-dione 21-acetate (the compound of Example 7E).

Similarly, 16α-methyl-11β,19-oxido-5-pregnene-17α,19,21-triol-3,20-dione 21-propionate and 16α-ethyl-11β,19-oxido-5-pregnene-17α,19,21-triol-3,20-dione 21-acetate are reacted with hydrochloric acid in dioxane to obtain respectively 16α - methyl-11β,19-oxido-4-pregnene-17α,19,21-triol-3,20-dione 21-propionate and 16α-ethyl-11β,19-oxido - 4 - pregnene-17α,19,21-triol-3,20-dione 21-acetate, respectively.

E. *19 - nor - 5(10) - pregnene - 11β,17α,21-triol-3,20-dione.*—In a manner similar to that described in Examples 7F and 7G, allow 11β,19-oxido-4-pregnene-17α,19,21-triol-3,20-dione 21-acette to react with methanolic sodium hydroxide followed by acetic acid whereby is obtained 19 - nor - 5(10)-pregnene-11β,17α,21-triol-3,20-dione 11-formate 21-acetate which is hydrolyzed with aqueous sodium hydroxide to give 19-nor-5(10)-pregnene-11β, 17α,21-triol-3,20-dione 21-acetate.

In a similar manner, 16α-methyl-11β,19-oxido-4-pregnene-17α,19,21-triol-3,20-dione 21-propionate and 16α-ethyl - 11β,19 - oxido - 5 - pregnene-17α,19,21-triol-3,20-dione 21-acetate are reacted with methanolic sodium hydroxide followed by acetic acid yielding respectively 16α-methyl - 19 - nor - 5(10)-pregnene-11β,17α,21-triol-3,20-dione 11-formate 21-propionate and 16α-ethyl-19-nor-5(10) - pregnene - 11β,17α,21-triol-3,20-dione 11-formate 21-acetate which is hydrolyzed with aqueous sodium hydroxide yielding respectively 16α-methyl-19-nor-5(10)-pregnene-11β,17α,21-triol-3,20-dione 21-acetate and 16α-ethyl-19-nor-5(10)-pregnene-11β,17α,21-triol-3,20 - dione 21-acetate.

*Example 15.—Preparation of esters*

A. *Esters of 11β-formyloxy - 19 - nor - 5(10)-dehydro steroids.*—(1) Preferably esters of primary or secondary hydroxyl groups of the novel 11β-formyloxy-19-nor-5(10)-dehydro steroids of this invention are introduced into the molecule prior to the preparation of the 11-nitrite ester of the Δ⁴ or Δ⁵-steroidal starting compound in the process of this invention. Esterifield 11β-formyloxy-19-nor-5(10)-dehydro derivatives will then result directly from my process as exemplified in Examples 4B, 6C, 7F, 8E, 10F, and 13.

In these examples the acetate ester was used almost exclusively for illustrative purposes. Other lower alkanoic acid esters or aromatic carboxylic acid esters or sulfonate esters of the starting compounds of this process are prepared according to the procedure described in Example 1A by substituting for acetic anhydride the anhydride of other alkanoic acids, the acid halide of a sulfonic acid or of an aromatic carboxylic acid. Thus for example, hydrocortisone, i.e., 4-pregnene-11β,17α,21-triol-3,20-dione, when reacted according to the procedure of the first paragraph of Example 1A but substituting for acetic anhydride the anhydride of other lower alkanoic acids, such as, propionic, valeric, and caproic anhydrides or the acid halide of a sulfonic acid or aromatic carboxylic acid, e.g., p-toluenesulfonyl chloride or benzoyl chloride respectively will yield the respective 21-ester, i.e., the 21-propionate, the 21-valerate, the 21-caproate, the 21-p-toluenesulfonate, or the 21-benzoate respectively of hydrocortisone, which when reacted according to the procedures of 7A through 7F, will yield respectively the 21-propionate, 21-valerate, 21-caproate, 21-p-toluenesulfonate or 21-benzoate of 11β-formyloxy-19-nor-5(10)-pregnene-17α,21-diol-3,20-dione.

To prepare the ester of a tertiary hydroxyl group in an 11β-formyloxy-19-nor-5(10)-dehydro steroid, the ester group is also preferably introduced into the starting compound of this process. Thus, for example, 11β,17α-dihydroxy-16α-methyl-progesterone (15 grams) dissolved in acetic acid (300 ml.) and trifluoro acetic anhydride (90 ml.) is stirred at 75° C. for 30 minutes. The reaction mixture is poured into water (4 liters) and the precipitated solid is collected, washed with water and dried to give 11β-hydroxy-16α-methyl-17α-acetoxyprogesterone, which when reacted in a manner similar to that described in Examples 10 and 13 will yield directly 11β-formyloxy-17α-acetoxy-16α-methyl-19-nor-5(10)-pregnene-3,20-dione.

(2) The introduction of a dibasic acid ester group such as the 21-hemisuccinate is preferably effected after the formation of the 19-nor-5(10)-dehydro steroid such as is illustrated in the following preparations a and b. The dibasic acid esters and their alkali metal salts are particularly valuable in the preparation of water soluble pharmaceutical preparations.

(a) To 1 gram of 11β-formyloxy-19-nor-5(10)-pregnene-21-ol-3,20-dione (the compound of Example 3A) in 10 ml. of pyridine add 1 gram of succinic anhydride. Heat the reaction mixture on a steam bath for one hour then cool and dilute with water. Filter the solid which separates, wash with water, and dry yielding 11β-formyloxy-19-nor-5(10)-pregnene-11β-ol-3,20-dione 21-hemisuccinate (i.e., 19-nor-5-(10)-pregnene-11β,21-diol-3,20-dione 11-formate 21-hemisuccinate).

(b) To 1 gram of 11β-formyloxy-19-nor-5(10)-pregnene-21-ol-3,20-dione 21-hemisuccinate suspended in 100 ml. of water add 4.08 ml. of 10% aqueous solution of sodium hydroxide. Evaporate the resultant aqueous solution in vacuo to a residue of 11β-formyloxy-19-nor-5(10)-pregnene-21-ol-3,20-dione 21-sodium hemisuccinate.

(3) 11β-formyloxy-19-nor-5(10)-dehydro steroids having free hydroxyl groups elsewhere in the molecule are prepared in the manner similar to that described in Examples 2 and 3A whereby the esterified 5-dehydro-(11→19)-hemiacetal intermediate is hydrolyzed to the corresponding free alcohol prior to conversion to the requisite Δ⁴-3-keto-(11→19)-hemiacetal intermediate, which in turn is reacted with methanolic sodium hydroxide to yield an 11β-formyloxy-19-nor-5(10)-dehydro steroid of this invention having free hydroxyl groups elsewhere in the molecule, which in turn may be reacted in a manner similar to that described in Example 1a (first paragraph) or according to the procedures of Example 15 to obtain the corresponding 11β-formyloxy-19-nor-5(10)-dehydro steroidal esters, for example, 11β,19-oxido-16α-methyl-5-pregnene-17α,19,21-triol-20-one 3-ethylene ketal 21-acetate (prepared as described in Example 10D) and 11β,19-oxido-5-androstene-17β,19-diol-3-ethylene ketal 17-acetate (the compound of Example 6A) upon reaction with sodium hydroxide in the manner described in Example 2B will yield, respectively, 11β,19-oxido-16α-methyl-5-pregnene-17α,19,21-triol-20-one 3-ethylene ketal and 11β,19-oxido-5-androstene-17β,19-diol-3-ethylene ketal which is reacted with hydrochloric acid in dioxane according to the procedures of Example 2C to give respectively, 11β,19-oxido-16α-methyl-4-pregnene-17α,19,21-triol-3,20-dione and 11β,19-oxido-4-androstene-17β,19-diol-3-one each of which in turn is reacted with methanolic sodium hydroxide according to the procedure of Example 3A to give, respectively, 16α-methyl-19-nor-5(10)-pregnene-11β,17α,21-triol-3,20-dione 11-formate and 19-nor-5(10)-androstene-11β,7β-diol-3-one 11-formate. Reaction of each of the aforenamed 11β-formyloxy-19-nor-5(10)-dehydro steroids with benzoyl chloride in pyridine or succinic anhydride in pyridine according to procedures of this example will yield, respectively, 16α-methyl-19-nor-5(10)-pregnene-11β,17α,21-triol-3,20-dione 11-formate 21-benzoate, 16α-methyl-19-nor-5(10)-pregnene-11β,17α,21-triol-3,20-dione 11-formate 21-hemisuccinate and 19-nor-5(10)-androstene-11β,17β-diol-3-one 11-formate 17-benzoate and 19-nor-5(10)-androstene-11β,17β-diol-3-one 11-formate 17-hemisuccinate.

B. *Esters of 11β-hydroxy-19-nor-5(10)-dehydro steroids.*—Esterification of the 11β-hydroxyl compounds of this invention is preferably effected by means of pyridine and an acid chloride and an acid anhydride according to known procedures such as described in preceding Example 15A and is exemplified by the procedure shown below:

(1) Add 7.0 ml. of pyridine and 7.0 ml. of acetic anhydride to 19-nor-5(10)-pregnene-11β,21-diol-3,20-dione (the compound of Example 3) and allow the mixture to stand at room temperature for 20 hours. Add the reaction mixture to about a liter of ice water and extract with methylene chloride. Combine the methylene chloride extracts and distill to a residue of substantially 19-nor-5(10)-pregnene-11β,21-diol-3,20-dione diacetate. Purify by crystallization from ethyl acetate-hexane.

In the above procedure by substituting for acetic anhydride the anhydride of other alkanoic acids such as propionic, enanthic, and valeric, there is obtained the corresponding diester, i.e., the 11,21-dipropionate, the 11,21-dienanthate, and the 11,21-divalerate respectively, of 19-nor-5(10)-pregnene-11β,21-diol-3,20-dione.

In a similar manner, any of the 11β-hydroxy-19-nor-5(10)-dehydro steroids prepared in the preceding examples are converted to the corresponding ester. Thus, 19-nor-5(10)-androstene-11β,17β-diol-3-one (the compound of Example 6), 19-nor-5(10)-pregnene-11β,17α,21-triol-3,20-dione (the compound of Example 7), 19-nor-5(10)-pregnene-11β,16α,21-triol-3,20-dione (the compound of Example 8), 19-nor-5(10)-pregnene-11β-ol-3,20-dione (the compound of Example 9), 17α-methyl-19-nor-5(10)-androstene-11β,17β-diol-3-one, upon reaction with acetic anhydride in pyridine in the manner described above in this experiment will yield respectively 19-nor-5(10)-androstene-11β,17β-diol-3-one diacetate, 19-nor-5(10)-pregnene-11β,17α,21-triol-3,20-dione 11,21-diacetate, 19-nor-5(10)-pregnene-11β,16α,21-triol-3-20-dione 11,16,21-triacetate, 19-nor-5(10)-pregnene-11β-ol-3,20-dione 11-acetate, and 17α-methyl-19-nor-5(10)-androstene-11β,17β-diol-3-one 11-acetate.

I claim:

1. A compound selected from the group consisting of 19-nor-5(10)-dehydro steroids of the following formula:

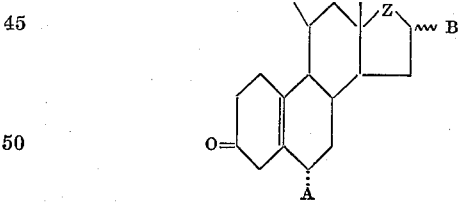

wherein A is a member selected from the group consisting of H, lower alkyl, and halogen; B is a member selected from the group consisting of H, lower alkyl, hydroxy and an acyloxy radical of an organic carboxylic acid having up to 8 carbon atoms; R is a member selected from the group consisting of hydrogen and an acid radical of an organic carboxylic acid having up to 8 carbon atoms; and Z is a member selected from the group consisting of:

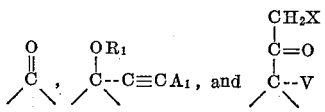

wherein $R_1$ is a member selected from the group consisting of H and an acid radical of an organic carboxylic acid having up to 8 carbon atoms; $A_1$ is a member selected from the group consisting of H, lower alkyl, and halogen; V is a member selected from the group consisting of H, hydroxy and an acyloxy radical of an organic carboxylic acid having up to 8 carbon atoms; and X is a member selected from the group consisting of H, halogen, hydroxy, acyloxy, and methyl and the 2α-methyl and 7α-methyl analogs thereof.

2. 19-nor-5(10)-pregnene-11β,21-diol-3,20-dione.

3. 20-ethylenedioxy-19-nor - 5(10) - pregnene-11β,21-diol-3-one 11-formate 21-acetate.

4. 19-nor-5(10)-pregnene-11β,21 - diol - 3,20-dione 11-formate.

5. 19-nor-5(10)-pregnene-11β,17α,21-triol-3,20-dione.

6. 19-nor-5(10)-pregnene-11β,17α,21 - triol-3,20-dione 11-formate 21-acetate.

7. 19-nor-5(10)-pregnene-11β,16α,21-triol-3,20-dione.

8. 19-nor-5(10)-pregnene-11β,16α,21 - triol-3,20-dione 11-formate 16,21-diacetate.

9. 16α-methyl-19-nor - 5(10) - pregnene - 11β,17α,21-triol-3-20-dione.

10. 16α-methyl-19-nor-5(10) - pregnene - 11β,17α,21-triol-3,20-dione 11-formate 21-acetate.

11. 16β-methyl-19-nor-5(10) - pregnene - 11β,17α,21-triol-3-20-dione.

12. 16β-methyl-19-nor-5(10) - pregnene - 11β,17α,21-triol-3,20-dione 11-formate 21-acetate.

13. 19-nor-5(10)-pregnene-11β-ol-3,20-dione.

14. 19-nor-5(10)-pregnene-11β,17α-diol-3,20-dione 11-formate 17-acetate.

15. In the process of preparing a 3-keto-11β-hydroxy-19-nor-5(10)-dehydro steroid selected from the group consisting of the androstane, pregnane, cholestane, and sapogenin series the steps which comprise irradiating an 11-nitrite ester of a steroid of the group consisting of a 3-oxygenated-11β-hydroxy-4-dehydro-C-19-steroid and a 3-oxygenated-11β-hydroxy-5-dehydro - C - 19-steroid said steroid being devoid of other A-ring unsaturations and being selected from the group consisting of the androstane, pregnane, cholestane, and sapogenin series and said ultraviolet light possessing at least some of the absorption bands of said 11-nitrite radical, whereby is obtained the corresponding 3-oxygenated 11β-hydroxy-19-oximino intermediate; hydrolizing said 3-oxygenated 11β-hydroxy-19-oximino intermediate to the corresponding 3-oxygenated-(11β→19)-hemiacetal intermediate; converting said 3-oxygenated-(11β→19)-hemiacetal intermediate to a 3-keto-4-dehydro-(11→19)-hemiacetal intermediate; treating with an alcoholic solution of base, said 3-keto-4-dehydro-(11→19)-hemiacetal whereby is formed a 3-keto-11β-formyloxy-19-nor-5(10)-dehydro steroid selected from the group consisting of the androstane, pregnane, cholestane, and sapogenin series.

16. In the process of preparing a 3-keto-11β-hydroxy-19-nor-5(10)-dehydro steroid selected from the group consisting of the androstane, pregnane, cholestane, and sapogenin series, the steps which comprise esterifying by means of nitrosyl chloride a steroid of the group consisting of a 3-oxygenated-11β-hydroxy-4-dehydro-C-19-steroid and a 3 - oxygenated - 11β-hydroxy-5-dehydro-C-19-steroid, said steroid being selected from the group consisting of the androstane, pregnane, cholestane, and sapogenin series, and being devoid of A-ring unsaturations other than between C–4 and C–5 and between C–5 and C–6, and wherein a 3-keto group and a 17-keto group, if present, are protected by a ketal derivative, and wherein all primary and secondary hydroxyl groups other than at C–11 are esterified; irradiating with ultraviolet light the 11-nitrite ester thereby formed, said ultraviolet light possessing at least some of the absorption bands of the 11-nitrite radical; isolating the resulting 3-oxygenated-11β-hydroxy-19-oximino-C-19-steroidal intermediate; hydrolyzing said 3-oxygenated-11β-hydroxy-19-oximino-C-19-steroidal intermediate to the corresponding 3-oxygenated-(11→19)-hemiacetal - C - 19-intermediate; converting the 3-oxygenated-(11→19)-hemiacetal-C-19-intermediate to the corresponding 3 - keto - (11→19)-hemiacetal-4-dehydro steroid; treating with an alcoholic solution of base said 3-keto-4-dehydro-(11→19)-hemiacetal whereby is formed a 3-keto-11β-formyloxy-19-nor-5(10)-dehydro steroid selected from the group consisting of the androstane, pregnane, cholestane and sapogenin series.

17. The process of claim 15 including the subsequent step of hydrolyzing said 3-keto-11β-formyloxy-19-nor-5(10)-dehydro steroid selected from the group consisting of the androstane, pregnane, cholestane, and sapogenin series to the corresponding 3-keto-11β-hydroxy-19-nor-5(10)-dehydro steroid selected from the group consisting of the androstane, pregnane, cholestane, and sapogenin series.

18. In the process of converting a 3-keto-11β-hydroxy-C-19-4-dehydro steroid selected from the group consisting of the androstane, pregnane, cholestane, and sapogenin series to the corresponding 3-keto-11β-hydroxy-19-nor 5(10)-dehydro steroid selected from the group consisting of the androstane, pregnane, cholestane, and sapogenin series the step which comprises treating a 3-keto-4-dehydro-(11→19)-hemiacetal of a C-19-steroid with an alcoholic solution of base whereby is formed the corresponding 3-keto-11β-formyloxy-19-nor-5(10)-dehydro steroid selected from the group consisting of the androstane, pregnane, cholestane, and the sapogenin series.

19. A compound selected from the group consisting of 11β-hydroxy-19-oximino steroids of the following structural formula and the 2α-methyl- and 7α-methyl- analogs thereof:

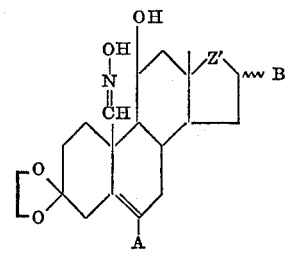

wherein A is a member selected from the group consisting of hydrogen, lower alkyl, and halogen; B is a member selected from the group consisting of hydrogen, lower alkyl, hydroxy, and an acyloxy radical of a hydrocarbon carboxylic acid having up to 8 carbon atoms; and Z' is a member selected from the group consisting of Z and an ethylene ketal derivative of Z, Z being a member selected from the group consisting of:

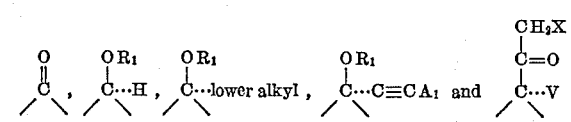

wherein $R_1$ is a member of the group consisting of hydrogen and an acid radical of a hydrocarbon carboxylic acid having up to 8 carbon atoms; $A_1$ is a member selected from the group consisting of hydrogen, lower alkyl and halogen; V is a member selected from the group consisting of hydrogen, hydroxy, and an acyloxy radical of a hydrocarbon carboxylic acid having up to 8 carbon atoms; and X is a member selected from the group consisting of hydrogen, halogen, hydroxy, and an acyloxy radical of a hydrocarbon carboxylic acid having up to 8 carbon atoms.

20. A compound selected from the group consisting of an (11→19)-hemiacetal of the the following structural formulae and the 2α-methyl- and 7α-methyl- analogs thereof:

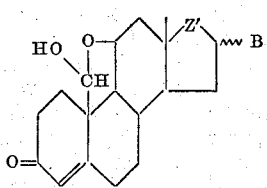

and

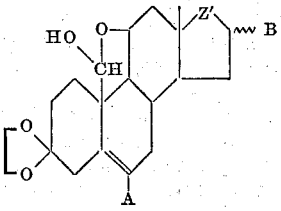

wherein A is a member selected from the group consisting of hydrogen, lower alkyl, and halogen; B is a member selected from the group consisting of hydrogen, lower alkyl, hydroxy, and an acyloxy radical of a hydrocarbon carboxylic acid having up to 8 carbon atoms; and $Z'$ is a member selected from the group consisting of Z and an ethylene ketal derivative of Z; Z being a member selected from the group consisting of:

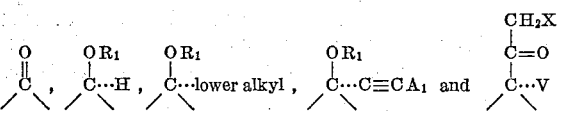

wherein $R_1$ is a member of the group consisting of hydrogen and an acid radical of a hydrocarbon carboxylic acid having up to 8 carbon atoms; $A_1$ is a member selected from the group consisting of hydrogen, lower alkyl and halogen; V is a member selected from the group consisting of hydrogen, hydroxy, and an acyloxy radical of a hydrocarbon carboxylic acid having up to 8 carbon atoms; and X is a member selected from the group consisting of hydrogen, halogen, hydroxy, and an acyloxy radical of a hydrocarbon carboxylic acid having up to 8 carbon atoms.

References Cited by the Examiner

UNITED STATES PATENTS 2,913,456  11/59  Magerlein _____ 260—239.55
2,991,295  7/61  Magerlein et al. _____ 260—397.5

LEWIS GOTTS, *Primary Examiner.*

UNITED STATES PATENT OFFICE
CERTIFICATE OF CORRECTION

Patent No. 3,205,226                                    September 7, 1965

Derek H. R. Barton

It is hereby certified that error appears in the above numbered patent requiring correction and that the said Letters Patent should read as corrected below.

Column 12, line 47, for "51-155° C." read -- 151-155° C. --; column 20, line 65, for "6α-bromo-" read -- 6α-methyl- --.

Signed and sealed this 28th day of June 1966.

(SEAL)
Attest:

ERNEST W. SWIDER                               EDWARD J. BRENNER
Attesting Officer                                   Commissioner of Patents